United States Patent
Serizawa et al.

(10) Patent No.: US 8,944,474 B2
(45) Date of Patent: Feb. 3, 2015

(54) HOLDER

(75) Inventors: Yasuyoshi Serizawa, Utsunomiya (JP);
Hiroyuki Sasaki, Utsunomiya (JP);
Kouichi Igarashi, Tochigi (JP); Kenji Ito, Aichi (JP)

(73) Assignee: Yazaki Corporation, Tokyo (JP)

(*) Notice: Subject to any disclaimer, the term of this patent is extended or adjusted under 35 U.S.C. 154(b) by 898 days.

(21) Appl. No.: 12/647,120

(22) Filed: Dec. 24, 2009

(65) Prior Publication Data
US 2010/0164226 A1 Jul. 1, 2010

(30) Foreign Application Priority Data

Dec. 25, 2008 (JP) .................................. 2008-330260
Dec. 25, 2008 (JP) .................................. 2008-330265

(51) Int. Cl.
*F16L 3/10* (2006.01)
*H02G 3/06* (2006.01)

(52) U.S. Cl.
CPC ............ *F16L 3/1091* (2013.01); *H02G 3/0691* (2013.01); *Y10S 285/903* (2013.01)
USPC ............................ 285/419; 285/373; 285/903

(58) Field of Classification Search
USPC .................................... 285/15, 373, 419, 903
See application file for complete search history.

(56) References Cited

U.S. PATENT DOCUMENTS

| | | | | |
|---|---|---|---|---|
| 3,711,633 A | * | 1/1973 | Ghirardi et al. | 174/135 |
| 3,846,725 A | * | 11/1974 | Mears, Jr. | 336/92 |
| 4,758,024 A | * | 7/1988 | Kaempen | 285/55 |
| 4,797,512 A | * | 1/1989 | Kumagai et al. | 174/135 |
| 4,854,665 A | * | 8/1989 | Gagnon | 385/100 |
| 5,046,766 A | * | 9/1991 | Lomberty et al. | 285/419 |

(Continued)

FOREIGN PATENT DOCUMENTS

| | | |
|---|---|---|
| JP | 62-159108 U | 10/1987 |
| JP | 1-96723 U | 6/1989 |

(Continued)

OTHER PUBLICATIONS

Communication dated Jan. 6, 2012, issued by the State Intellectual Property Office of the People's Republic of China in corresponding Chinese Patent Application No. 200910247042.4.

(Continued)

*Primary Examiner* — Aaron Dunwoody
*Assistant Examiner* — Fannie Kee
(74) *Attorney, Agent, or Firm* — Sughrue Mion, PLLC

(57) ABSTRACT

A holder includes a first cover that covers a part of a corrugated tube in a radial direction of the corrugated tube, and a second cover engaged with the first cover and that covers a remaining part of the corrugated tube in the radial direction. A first retaining portion is formed on the first cover and is engaged in a groove on a bellows-shaped outer face of the corrugated tube. A second retaining portion is formed on the second cover and is engaged in the groove on the bellows-shaped outer face of the corrugated tube. The first cover includes a base portion and a pair of side wall portions extended vertically respectively from both ends of the base portion. The first retaining portion includes a first retaining piece which continuously extends from one of the side wall portions to the base portion and a second retaining piece which continuously extends from the other of the side wall portions to the base portion. The first retaining piece and the second retaining piece are separated from each other with air gap at the base portion.

7 Claims, 25 Drawing Sheets

(56) References Cited

U.S. PATENT DOCUMENTS

| | | | | |
|---|---|---|---|---|
| 5,397,859 A | * | 3/1995 | Robertson et al. | 174/92 |
| 5,444,182 A | * | 8/1995 | Hoshino | 439/368 |
| 5,561,269 A | * | 10/1996 | Robertson et al. | 174/92 |
| 5,569,882 A | * | 10/1996 | Yokoyama et al. | 174/76 |
| 5,594,210 A | * | 1/1997 | Yabe | 174/76 |
| 5,796,041 A | * | 8/1998 | Suzuki et al. | 174/92 |
| 6,131,957 A | * | 10/2000 | Saito et al. | 285/133.21 |
| 6,450,829 B1 | * | 9/2002 | Weisz-Margulescu | 439/352 |
| 6,595,473 B2 | * | 7/2003 | Aoki et al. | 248/74.4 |
| 6,732,764 B2 | * | 5/2004 | Miyamoto et al. | 138/110 |
| 7,007,900 B2 | * | 3/2006 | Goodwin et al. | 248/68.1 |
| 7,044,761 B2 | * | 5/2006 | Sokol et al. | 439/263 |
| 7,581,564 B2 | * | 9/2009 | Tanaka et al. | 138/110 |
| 2003/0102142 A1 | * | 6/2003 | Miyamoto et al. | 174/52.1 |
| 2004/0227347 A1 | * | 11/2004 | Fundin et al. | 285/419 |

FOREIGN PATENT DOCUMENTS

| | | | |
|---|---|---|---|
| JP | 5-25920 U | 4/1993 | |
| JP | 6-59685 U | 8/1994 | |
| JP | 8168136 A | 6/1996 | |
| JP | 9-130941 A | 5/1997 | |
| JP | 11-8922 A | 1/1999 | |
| JP | 2000-13950 A | 1/2000 | |
| JP | 2008-154343 A | 7/2008 | |

OTHER PUBLICATIONS

Office Action dated Sep. 25, 2012, issued by the Japanese Patent Office in counterpart Japanese Patent Application No. 2008-330260.

Office Action dated Sep. 25, 2012, issued by the Japanese Patent Office in counterpart Japanese Patent Application No. 2008-330265.

Office Action dated Dec. 18, 2012 issued by the Japanese Patent Office in corresponding Japanese Patent Application No. 2008-330265.

* cited by examiner

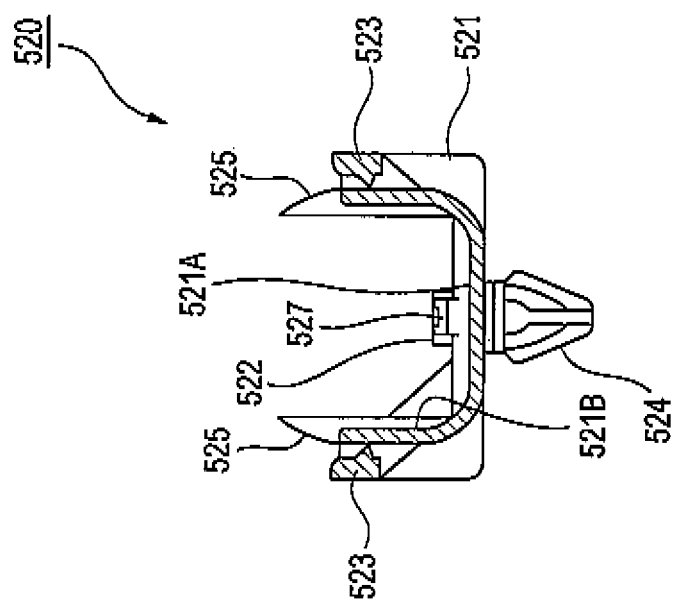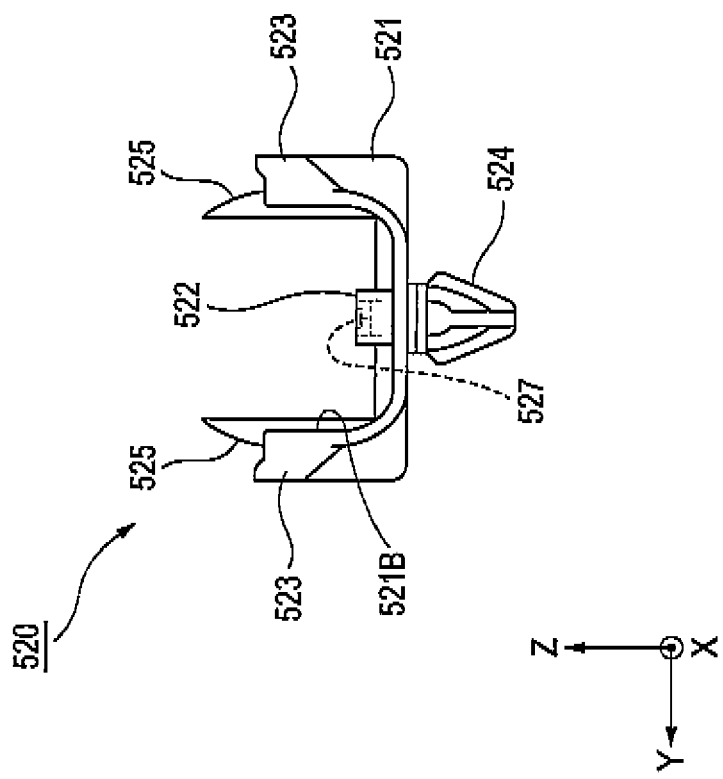

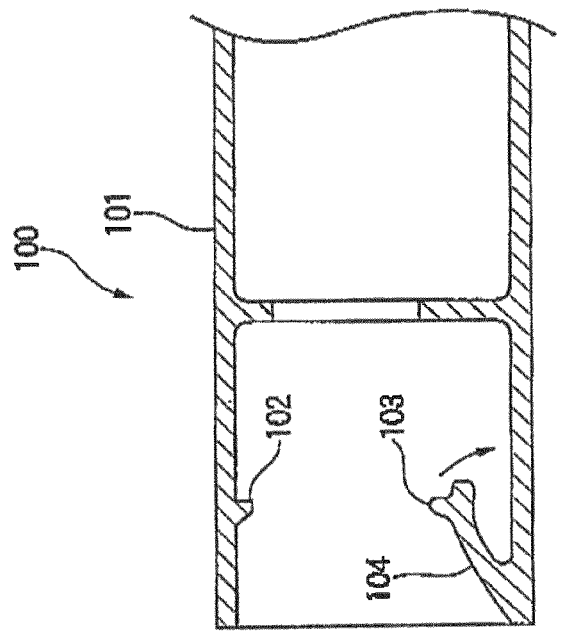
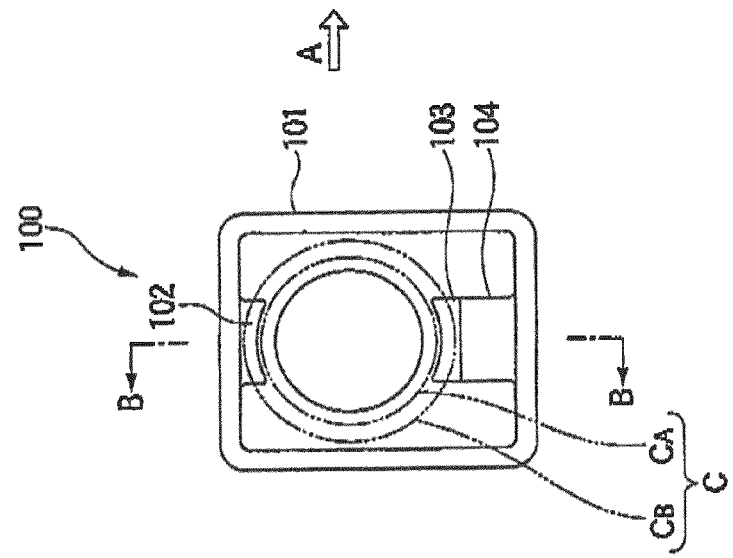
FIG. 25A PRIOR ART
FIG. 25B PRIOR ART

HOLDER

BACKGROUND

This invention relates to a holder for holding corrugated tubes each receiving wire members (such as electric wires and a wire harness) therein, and more particularly to a holder capable of positively fixing and holding any of various corrugated tubes of different outer diameters.

Also, this invention relates to a holder for holding bellows-shaped corrugated tubes each adapted to receive a bundle of long thin wire members (such as electric wires) therein and then to be installed, and more particularly to a holder for holding end portions of the corrugated tubes.

A corrugated tube of a bellows-shape is used for collectively receiving wire members (such as electric wires and a wire harness) therein to protect the same and then for arranging or installing these wire members according to a predetermined layout. There have also been developed holders and protectors each for holding two corrugated tubes together in such a manner that end portions of the two corrugated tubers are interconnected or communicated with each other (see, for example, JP-A-2000-13950).

Namely, as shown in FIG. 25A, there is known a tube-shaped fixing member or holder 100 for holding an end portion of any of various corrugated tubes C ranging from the small-diameter corrugated tube CA to the large-diameter corrugated tube CB. When the end portion of the corrugated tube C is inserted into the fixing member 100, an outer surface of the corrugated tube C is retained at two points by a retaining claw 102 and an elastic retaining piece portion 103 formed respectively at an upper portion and a lower portion of a housing 101 of the fixing member 100. Thus, the corrugated tube C can be easily fixed to the fixing member 100.

Also, when any of the corrugated tubes C (CA to CB) of different outer diameters is to be held by this holder 100, the difference between the outer diameters is absorbed by a tilting action of a tilting piece portion 104, and therefore any of the corrugated tubes C of different diameters can be held by the holder 100.

This conventional holder 100 is of such a construction that for each of the corrugated tubes C of different diameters (for example, for the corrugated tubes CA and CB as shown in FIG. 26A or B), the retaining claw 102 and the elastic retaining piece portion 103 formed respectively at the upper and lower portions of the housing 101 are engaged in a groove Co of the corrugated tube C at two (upper and lower) points. In this construction, the stability of holding of the corrugated tube achieved by the gripping of the retaining claw 102 and the elastic retaining piece portion 103 varies depending on the outer diameter of the corrugated tube. Namely, when a large external force such as a pulling force or a torsional force acts on the corrugated tube of a larger outer diameter, there is a possibility that the corrugated tube may be disengaged from the holder laterally at regions where the retaining claw 102 and the elastic retaining piece portion 103 are not engaged with the corrugated tube.

Also, a bellows-shaped corrugated tube is used for receiving long thin wire members (such as a bundle of electric wires and a wire harness) therein to protect the same and then for being flexed to be installed according to a predetermined layout. An end portion of the corrugated tube is held by a holder or a protector as disclosed, for example, in Patent Literatures 1 to 4.

Namely, in a box-shaped holder for holding end portions of corrugated tubes which is disclosed in Patent Literature 1, when the end portion of the corrugated tube is inserted into the interior of the holder through a hole in a side wall thereof, a peripheral wall of this end portion is inserted between a bottom wall of the holder and an elastic holding piece portion, and is held therebetween, so that the corrugated tube end portion is held by the holder. This box-shaped holder includes a plurality of holes formed through the side (or peripheral) wall, and a plurality of elastic holding piece portions formed on the bottom wall. When the end portions of the corrugated tubes are inserted into these holes, respectively, the corrugated tubes are held by the holder, and therefore the plurality of corrugated tubes can be connected together.

A protector disclosed in Patent Literature 2 includes a body having a bottom wall and a pair of side walls which extend long in a longitudinal direction of wires so that the body can receive the wires therein, and a cover for closing an open top of the body. When the open top of the body is closed by the cover, the cover presses the (bundle of) wires against the bottom wall, thereby holding the wires. More specifically, each of the side walls of the body has a plurality of step portions arranged in an upward-downward direction, and can be contracted in the upward-downward direction. The cover has interconnecting piece portions, and these interconnecting piece portions are inserted respectively into retaining tubular portions formed at the side walls, and are retained therein so that the mounting position of the cover relative to the body can be adjusted. With this construction, the cover can press the wire bundle against the bottom wall of the body to hold the wire bundle regardless of the thickness of the wire bundle.

A protector disclosed in Patent Literature 3 comprise a body for receiving a wire bundle received in a corrugated tube, and a cover for closing an open top of the body. The body is so constructed as to provisionally retain a wire bundle, and the worker can connect the cover to the body without grasping the corrugated tube.

Patent Literature 4 discloses a fixing member or holder for holding an end portion of a corrugated tube. A retaining claw and an elastic holding piece portion are formed respectively at an upper portion and a lower portion of an inner surface of an end portion of the fixing member. When the end portion of the corrugated tube is inserted into the fixing member, an outer surface of the corrugated tube is engaged with the retaining claw and the elastic holding piece portion, so that the corrugated tube is easily held by the fixing member.

[Patent Literature 1] JP-A-9-130941
[Patent Literature 2] JP-UM-A-5-025920
[Patent Literature 3] JP-A-11-008922
[Patent Literature 4] JP-A-2000-013950

However, any of the devices of the above Patent Literatures 1 to 4 has not been designed to fix and hold a plurality of corrugated tubes of different outer diameters, and therefore could not positively hold the corrugated tubes of different outer diameters.

For example, in the holder disclosed in Patent Literature 1, the end portion of the corrugated tube is held by the bottom wall and the elastic holding piece portion. Therefore, the end portion of the corrugated tube can not be sufficiently held by the holder. Particularly, this holder is not suited for holding a plurality of corrugated tubes of different outer diameters. The holder of Patent Literature 2 is designed to hold the wire bundle, and is not designed to hold a corrugated tube. The protector of Patent Literature 3 is not designed to hold end portions of a plurality of corrugated tubes. The fixing member of Patent Literature 4 is formed into a tubular shape, and is different from the type of holder in which a corrugated tube is received in a body with an open top, and then this open top is closed by a cover.

SUMMARY

This invention has been made in view of the above circumstances, and a first object of the invention is to provide a holder capable of positively holding any of corrugated tubes of difference outer diameters.

Also, a second object of the invention is to provide a holder capable of holding corrugated tubes of different diameters.

In order to achieve the above object, according to the present invention, there is provided a holder comprising:

a first cover that covers a part of a corrugated tube in a radial direction of the corrugated tube;

a second cover engaged with the first cover and that covers a remaining part of the corrugated tube in the radial direction, wherein a first retaining portion is formed on the first cover and is engaged in a groove on a bellows-shaped outer face of the corrugated tube;

wherein a second retaining portion is formed on the second cover and is engaged in the groove on the bellows-shaped outer face of the corrugated tube; and wherein the first cover includes a base portion and a pair of side wall portions extended vertically respectively from both ends of the base portion;

wherein the first retaining portion includes a first retaining piece which continuously extends from one of the side wall portions to the base portion and a second retaining piece which continuously extends from the other of the side wall portions to the base portion; and wherein the first retaining piece and the second retaining piece are separated from each other with air gap at the base portion.

Preferably, the part of the corrugated tube is a radially-lower portion of a corrugated tube, and the remaining part of the corrugated tube is a radially-upper portion of the corrugated tube.

Preferably, the second cover includes a base portion and a pair of side wall portions extended vertically respectively from both ends of the base portion. The second retaining portion continuously extends between the side wall portions of the second cover and is integrally formed on the base portion of the second cover.

Preferably, the second cover includes a base portion and a pair of side wall portions extended vertically respectively from both ends of the base portion. The second retaining portion includes a first retaining piece which continuously extends from one of the side wall portions of the second cover to the base portion of the second cover and a second retaining piece which continuously extends from the other of the side wall portions of the second cover to the base portion of the second cover. The first retaining piece and the second retaining piece of the second retaining portion are separated from each other with air gap at the base portion of the second cover.

According to the present invention, there is also provided a holder for holding end portions of two bellows-shaped corrugated tubes having different outer diameters respectively, comprising:

a base member that covers radially-lower portions of the end portions of the corrugated tubes, and includes a pair of first retaining portions for being engaged respectively in grooves on bellows-shaped outer faces of the end portions of the corrugated tubes; and a cover member engaged with the base member to cover radially-upper portions of the end portions of the corrugated tubes, wherein the cover member includes:

a first upper cover portion having a second retaining portion for being engaged in the groove on the bellows-shaped outer face of the end portion of one of the corrugated tubes;

a second upper cover portion having a third retaining portion for being engaged in the groove on the bellows-shaped outer face of the end portion of the other of the corrugated tubes; and a flexible interconnecting portion interconnecting the first upper cover portion and the second upper cover portion.

Preferably, the flexible interconnecting portion is comprised of an elastic material.

Preferably, the flexible interconnecting portion has a bellows-shape.

Preferably, the flexible interconnecting portion is deformed so as to correspond to a difference between a first distance and a second distance due to the difference in outer diameters of the corrugated tubes. The first distance is a length between the base member and the first upper cover portion. The second distance is a length between the base member and the second upper cover portion.

BRIEF DESCRIPTION OF THE DRAWINGS

The above objects and advantages of the present invention will become more apparent by describing in detail preferred exemplary embodiments thereof with reference to the accompanying drawings, wherein:

FIG. 15A is a side-elevational view of the base, and FIG. 15B is a cross-sectional view taken along the line VB-VB of FIG. 12;

FIG. 25A is a side-elevational view showing a conventional holder, and

FIG. 25B is a cross-sectional view thereof; and

DETAILED DESCRIPTION OF EXEMPLARY EMBODIMENTS

The present invention will now be described in detail with reference to the accompanying drawings.

First Embodiment

Figure 1:
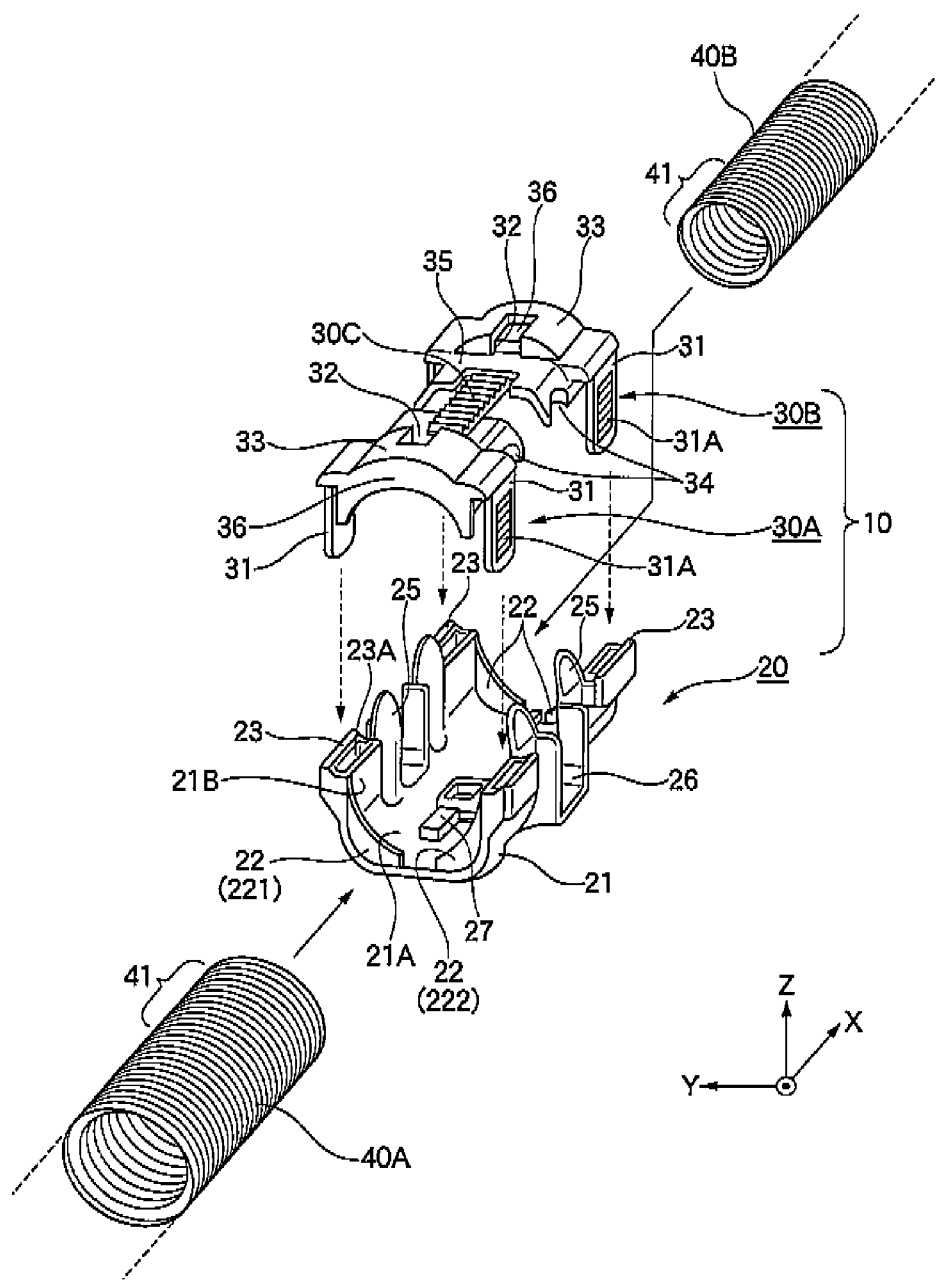
FIG. 1 is a perspective view showing a first embodiment of a holder of the present invention and corrugated tubes.

As shown in FIG. 1, a holder 10 functions as a protector for interconnecting corrugated tubes 40A and 40B of the same diameter or different diameters. The holder 10 includes two parts, that is, a base 20 and a cover unit including the first upper cover 30A and the second upper cover 30B interconnected by a flexible interconnecting portion 30C. The base 20 is formed into a one-piece construction by a rigid synthetic resin, and also the cover unit is formed into a one-piece construction by a (rigid) synthetic resin. Although only end portions 41 of the corrugated tubes 40A and 40B are mainly shown in FIG. 1 for description purposes, each corrugated tube is actually formed long, and is adapted to receive, for example, a bundle of 50 wires therein to protect the same, and is adapted to be arranged or installed, for example, on a body panel of an automobile according to a predetermined layout.

Figure 2A:
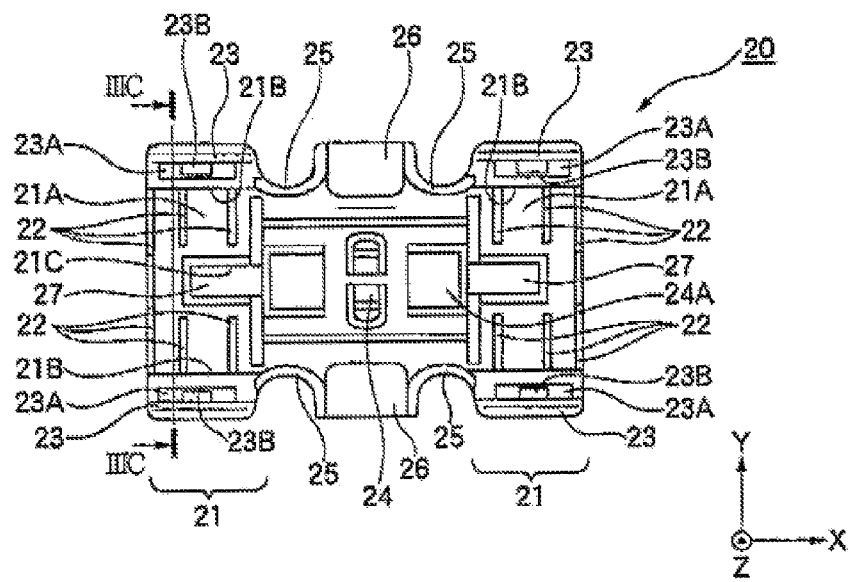
FIG. 2A is a plan view showing a base of the holder.
Figure 2B:
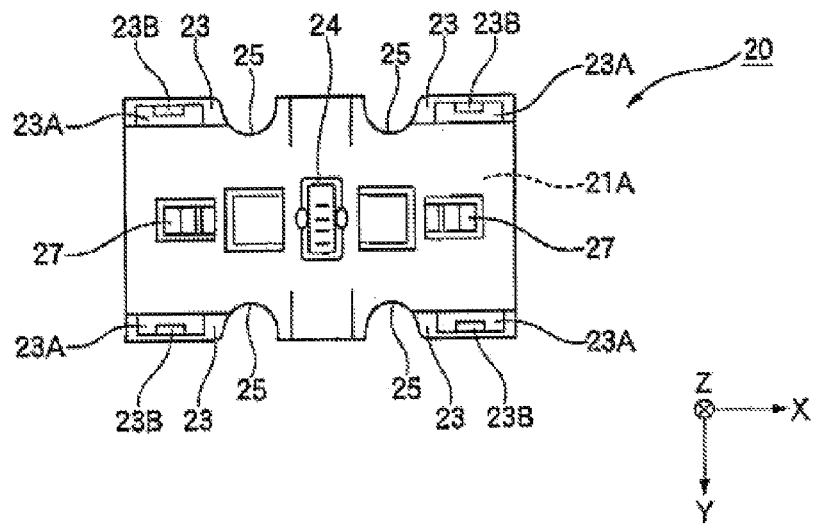
FIG. 2B is a bottom view of the base.
Figure 3A:
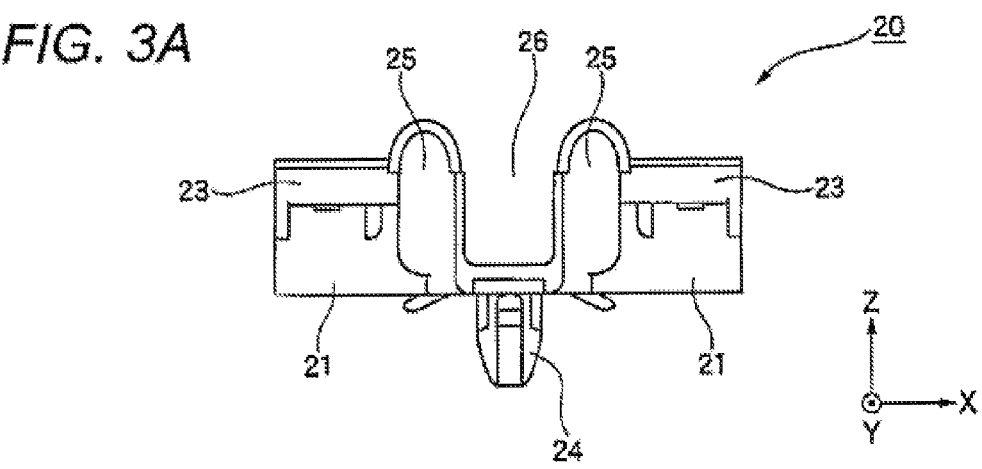
FIG. 3A is a front-elevational view of the base.

As shown in FIGS. 1 to 3, the base 20 is adapted to hold a lower outer surface and opposite outer side surfaces of each of the two corrugated tubes 40A and 40B. The base 20 includes a pair of holding portions 21 formed respectively at opposite (front and rear) end portions thereof spaced from each other in a longitudinal direction X, base-side retaining portions 22 formed on inner peripheral surfaces of the holding portions 21, retaining portions 23 formed respectively at opposite side portions (spaced from each other in a transverse direction Y perpendicular to the longitudinal direction X) of each of the opposite (front and rear) end portions of the base 20, a fixing portion 24 projecting downwardly from a longitudinally-central portion of a bottom of the base 20, two pairs of guide bars 25 provided between the holding portions 21 and disposed respectively at front and rear sides of the central portion of the base 20, a pair of right and left branch wire lead-out portions 26 formed respectively at the transversely-opposite side portions of the base 20 at the longitudinally-central portion thereof, and a pair of elastic holding piece portions 27 projecting respectively from the inner surfaces of the holding portions 21 and extending axially respectively toward the outer ends of the holding portions 21.

The holding portions 21 are formed into such a shape as to respectively receive the end portions 41 of the corrugated tubes 40A and 40B (which are to be interconnected) to support the outer peripheral surfaces of the end portions 41, respectively. In this embodiment, each of the holding portions 21 includes a floor portion 21A for supporting the end portion 41 of the corrugated tube 40A, 40B from the lower side thereof, a pair of right and left side wall portions 21B extending upwardly respectively from opposite side edges of the floor portion 21A so as to support the end portion 41 laterally, and an opening 21C formed through the floor portion 21A. The holding portion 21, when viewed from the end thereof, has a generally U-shape as shown in FIG. 3. Particularly, the plurality of the base-side retaining portions 22 (each interrupted at its central portion) are formed over the area including the floor portion 21A and the side wall portions 21B of each holding portion 21 as shown in FIGS. 1 and 2, and in other words each base-side retaining portion 22 is formed integrally on the floor portion 21A and the side wall portion 21B as will be more fully described later.

The base-side retaining portions 22 are used for completely retaining the corrugated tubes 40A and 40B (when the upper covers are closed) after the corrugated tubes are provisionally retained by the elastic holding piece portions 27. Namely, these base-side retaining portions 22 are elastically fitted into respective grooves on the bellows-shaped outer surfaces of the end portions 41 of the corrugated tubes 40A and 40B to be engaged in the grooves, and hold or retain the corrugated tubes 40A and 40B on the base 20, thereby preventing the axial movement of the corrugated tubes 40A and 40B.

Figure 3B:
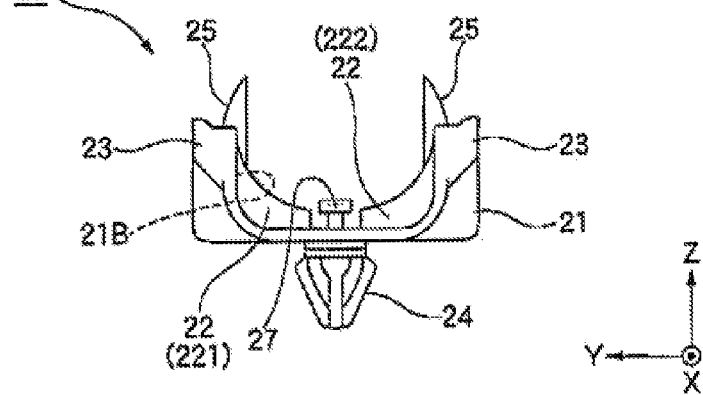
FIG. 3B is a side-elevational view of the base.
Figure 3C:
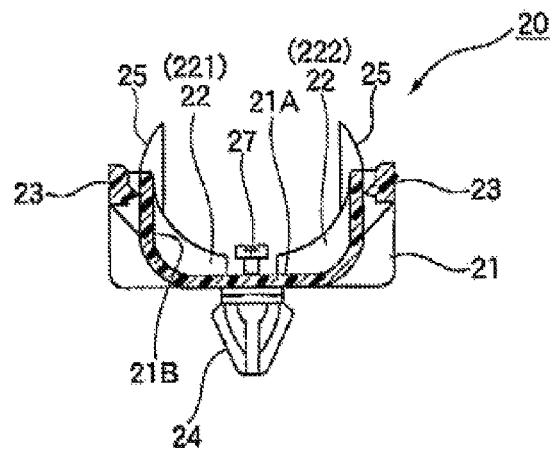
FIG. 3C is a cross-sectional view taken along the line IIIC-IIIC of FIG. 2A.

In this embodiment, each base-side retaining portion 22 is a projection of a generally arcuate shape (crescent-shape) which is formed integrally on the floor portion 21A and the side wall portions 21B and projects toward the axis of the end portion 41 of the corrugated tube 40A, 40B, as shown in FIGS. 3B and 3C. Each base-side retaining portion 22 interrupted at its central portion includes a base-side continuous retaining portion (hereinafter referred to as "first base-side retaining portion) 221 formed in a continuous manner on the left side wall portion 21B (FIG. 1) and the floor portion 21A, and a base-side continuous retaining portion (hereinafter referred to as "second base side retaining portion) 222 formed in a continuous manner on the right side wall portion 216

(FIG. 1) and the floor portion 21A. The first base-side retaining portion 221 and the second base-side retaining portion 222 are not connected together but are separated from each other at the floor portion 21A.

The four retaining portions 23 are formed respectively on outer surfaces of the four side wall portions 21B of the pair of holding portions 21, and have a generally rectangular tubular shape. The four retaining portions 23 have respective interconnecting piece retaining holes 23A for respectively receiving interconnecting piece portions 31 of the first and second upper covers 30A and 30B. In this embodiment, the four retaining portions 23 are formed respectively at four corner portions of the base 20, and an elastic retaining claw 23B is formed in a projecting manner within the interconnecting piece retaining hole 23A of each retaining portion 23 as shown in FIG. 2.

The fixing portion 24 shown in FIG. 3 is adapted to be mounted on a mounting member (not shown) such as a panel, and in this embodiment the fixing portion 24 serving as fixing means is inserted into a mounting hole in the mounting member to be fixed thereto. In the illustrated embodiment, although this fixing portion 24 has an anchor-shape, it can be replaced by any other suitable fixing means for being pushed into a mounting hole in the mounting member to be fixed thereto, and for example the fixing portion 24 may be replaced by fixing means which is fixed to the mounting member and is engaged with a button-type stud (T-stud) for fixing purposes.

The four guide bars 25 have a generally semi-cylindrical shape (that is, is have a generally arc-shaped transverse cross-section), and are formed adjacent respectively to the four side wall portions 21B of the pair of holding portions 21 and are upstanding in parallel relation to the side wall portions 21B. The guide bars 25 serve to guide the first and second upper covers 30A and 30B so as to keep them in a proper posture at the time of connecting the first and second upper covers 30A and 30B to the base 20. Although it is not essential to provide the guide bars 25, the provision of these guide bars 25 enables this cover connecting operation to be smoothly and positively carried out. In the illustrated embodiment, although the guide bars 25 have the generally semi-cylindrical shape, these guide bars 25 can have any other suitable shape in so far as they can properly guide the covers 30A and 30B.

The branch wire lead-out portions 26 are provided for the leading-out of desired wires of the wire bundle (extending outwardly from the end portions 41 of the corrugated tubes 40A and 40B) therethrough. Even after the first and second upper covers 30A and 30B are connected to the base 20 to cover the respective corrugated tubes, the branch wire lead-out portions 26 are kept in an open condition.

Figure 6A:
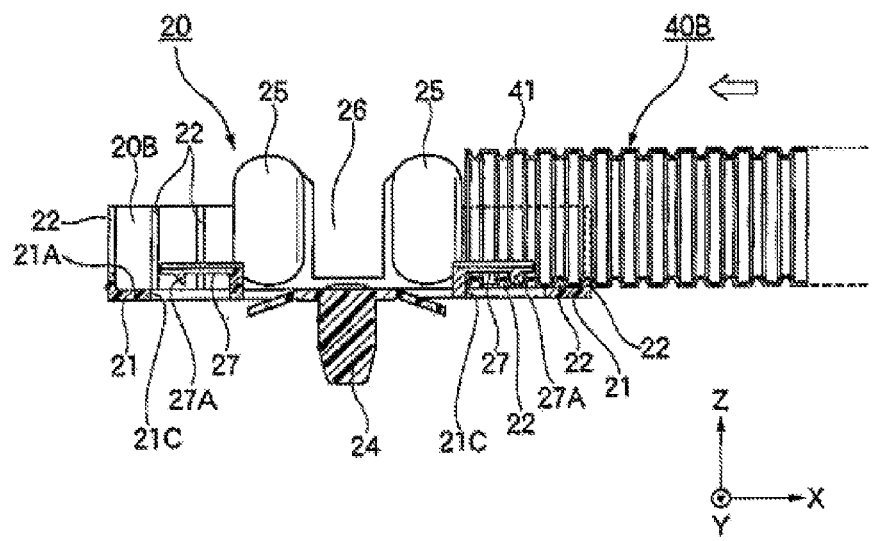
FIG. 6A is a view showing a condition in which the corrugated tube is primarily and provisionally retained on the base.
Figure 6B:
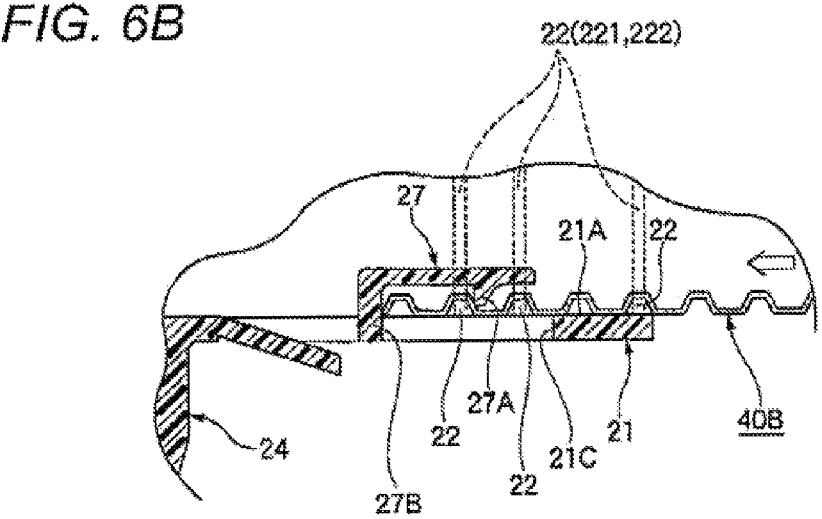
FIG. 6B is an enlarged view of an important portion.

When each corrugated tube 40A, 40B is to be attached to the base 20, the elastic holding piece portion 27 intrudes into the inside of the end portion 41 of the corrugated tube 40A, 40B and is elastically engaged in a groove on the bellows-shaped inner surface of the end portion 41 as shown in FIG. 6, thereby provisionally retaining the corrugated tube 40A, 40B on the base 20. In this embodiment, each elastic holding piece portion 27 has a generally recumbent L-shape, and first projects upwardly from the floor portion 21A of the holding portion 21 to a height equal to or slightly larger than the height of the grooves on the bellows-shaped inner surface of the corrugated tube end portion 41, and then extends at this height toward the outer end of the holding portion 21 (see FIG. 6). A retaining claw 27A for being elastically fitted in the groove on the bellows-shaped inner surface of the corrugated tube end portion 41 is formed at a distal end portion of the elastic holding piece portion 27.

Figure 4A:
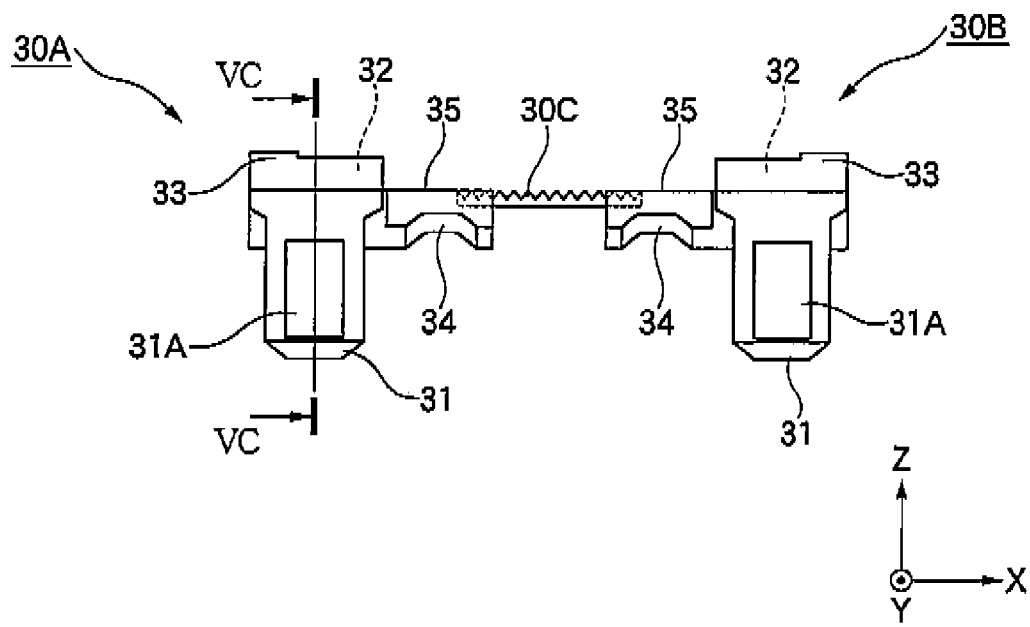
FIG. 4A is a front-elevational view showing a first upper cover and a is second upper cover of the holder.
Figure 4B:
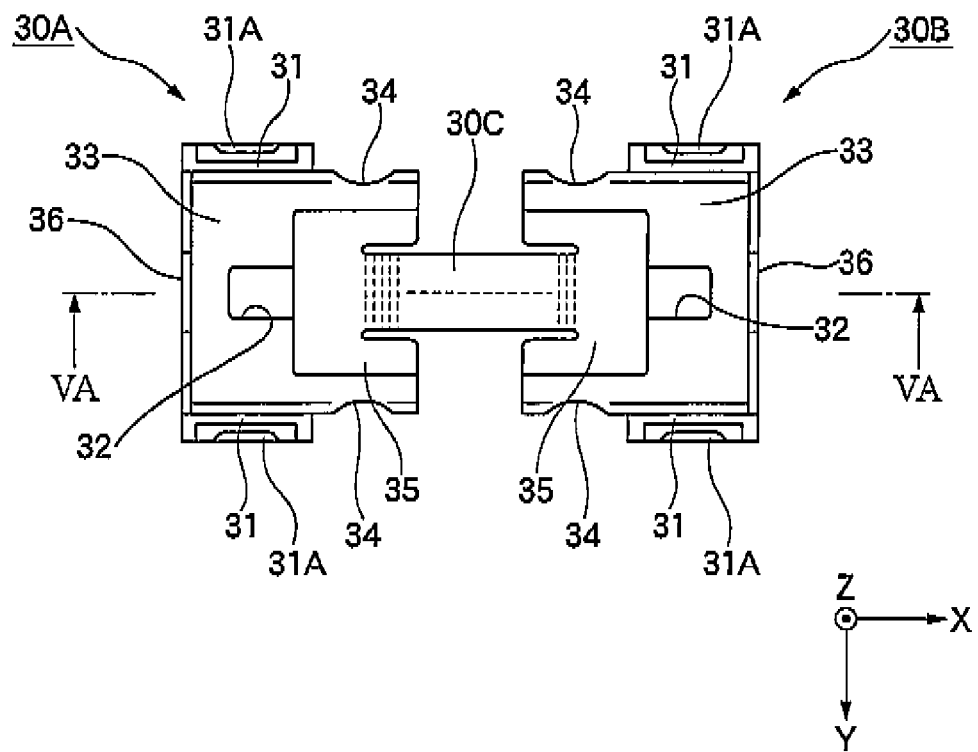
FIG. 4B is a bottom view showing the first and second upper covers.
Figure 5A:
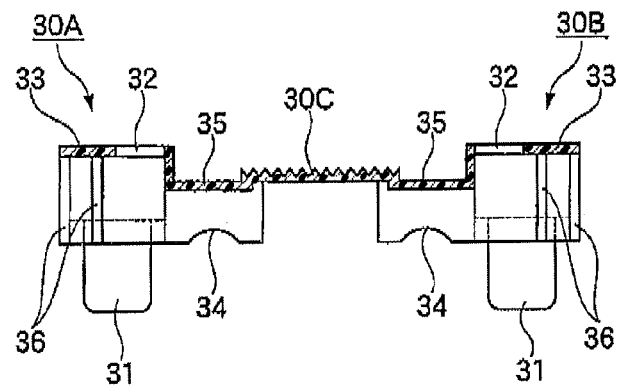
FIG. 5A is a cross-sectional view taken along the line VA-VA of FIG. 4B.

On the other hand, the first upper cover 30A and the second upper cover 30B are integrally interconnected by the flexible interconnecting portion 30C of a flexible nature as shown in FIGS. 1, 4 and 5. The first and second upper covers 30A and 30B cover the open top of the base 20, and completely (secondarily) retain the respective corrugated tubes 40A and 40B provisionally retained on the base 20.

Each of the first and second upper covers 30A and 30B includes a cover body portion 33 having the interconnecting piece portions 31 and a position confirmation opening 32, a base portion 35 having guide recess portions 34, and cover-side retaining portions 36.

Figure 8:
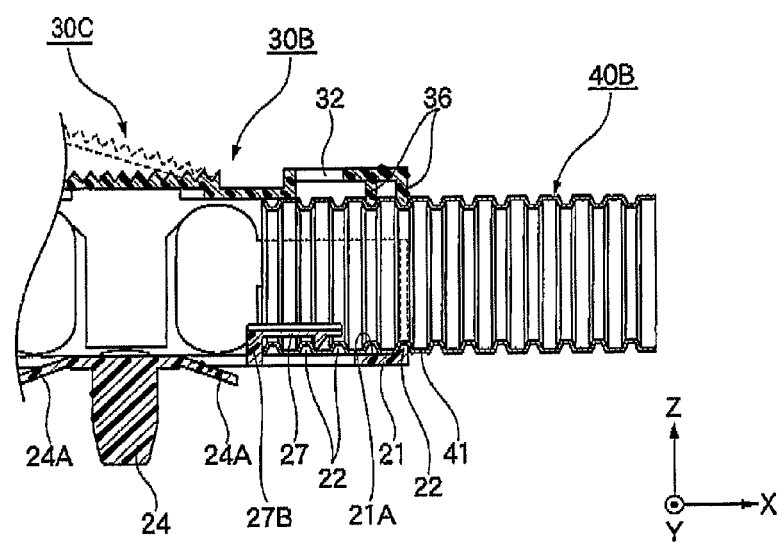
FIG. 8 is a view showing a condition in which the corrugated tube is secondarily (completely) retained by the second upper cover.

The flexible interconnecting portion 30C has a generally bellows-shape so that when the two corrugated tubes 40A and 40B to be connected together are different in diameter from each other, the flexible interconnecting portion 30C can be inclined (see FIG. 8) to allow (or absorb) the difference in height (relative to the base 20) between the first and second upper covers 30A and 30B due to the difference in outer diameter between the two corrugated tubes 40A and 40B. In this embodiment, the first and second upper covers 30A and 30B can cover the two corrugated tubes 40A and 40B, respectively, from the upper side while only the flexible interconnecting portion 30C is kept in an inclined condition. Also, when the two corrugated tubes 40A and 40B have the same diameter (see FIG. 8), the first and second upper covers 30A and 30B cover the two corrugated tubes 40A and 40B, respectively, from the upper side while the flexible interconnecting portion 30C is kept in a horizontal posture.

The flexible interconnecting portion 30C is not limited to the bellows-shape as shown in this embodiment, and can be of any other suitable construction in so far as the first and second upper covers 30A and 30B can positively cover the two corrugated tubes 40A and 40B, respectively, from the upper side to fix them regardless of whether the two corrugated tubes 40A and 40B to be connected together have the same diameter or different diameters. Therefore, for example, a thin plate-like flexible interconnecting portion may be molded integrally with the first and second upper covers.

In this embodiment, although the flexible interconnecting portion 30C is integrally molded with the first and second upper covers 30A and 30B, using a suitable synthetic resin, the cover unit may be formed by a method in which separate first and second upper covers and a separate flexible interconnecting portion are prepared, and then opposite end portions of this flexible interconnecting portion are releasably connected to the first and second upper covers to be fixed thereto by suitable means (not shown). In another modified example, a flexible interconnection portion is integrally molded with the base portion 35 of one of the first and second upper covers, and a free end portion of this flexible interconnecting portion is releasably connected to the other upper cover.

The interconnecting piece portions 31 are provided for attaching or connecting the upper covers 30A and 30B to the base 20, and can attach the first upper cover 30A and the second upper cover 30B to the base 20 while adjusting the amount of fastening of the first upper cover 30A relative to the base 20 and the amount of fastening of the second upper cover 30B relative to the base 20 independently of each other. In this embodiment, the four interconnecting piece portions 31 are formed respectively at those portions of the first and second upper covers 30A and 30B corresponding respectively to the interconnecting piece retaining holes 23A of the four retaining portions 23. The interconnecting piece portions 31 are inserted respectively into the interconnecting piece retaining holes 23A of the retaining portions 23, and are retained respectively by the retaining claws 23B, and by doing so, the first upper cover 30A and the second upper cover 30B can be independently fastened to the base 20 to be integrally connected thereto.

Each interconnecting piece portion 31 is formed into a leg-shape so as to be inserted into the interconnecting piece retaining hole 23A. The amount of insertion of each interconnecting piece portion 31 into the interconnecting piece retaining hole 23A of the retaining portion 23 is adjusted according to the size of the outer diameter of the corresponding corrugated tube 40A, 40B. In this embodiment, a plurality (or row) of retaining projections 31A for retaining engagement with the retaining claw 23B in the interconnecting piece retaining hole 23A are formed on the interconnecting piece portion 31, and are arranged at equal intervals in the longitudinal direction of the interconnecting piece portion 31.

Preferably, retaining portions of the retaining projections 31A for retaining engagement with the retaining claw 23B are formed as ratchet teeth, and with this construction when the interconnecting piece portion 31 is inserted into a desired position within the interconnecting piece retaining hole 23A, the interconnecting piece portion 31 is held or retained in this position, thereby positively maintaining the completely-retained condition. When the left and right corrugated tubes 40A and 40B of different diameters are to be connected together, the amount of insertion of the interconnecting piece portions 31 of the first upper cover 30A and the amount of insertion of the interconnecting piece portions 31 of the second upper cover 30B are adjusted independently of each other as described above, and by doing so, the end portions 41 of the corrugated tubes of different diameters can be positively retained in such a manner that the upper surfaces of the end portions 41 of the corrugated tubes of different diameters are positively held respectively against top wall portions of the cover body portions 33 of the first and second upper covers 30A and 30B.

The position confirmation openings 32 serve as confirmation windows through which the inserted condition of the corrugated tubes 40A and 40B and the positions of the end portions 41 within the respective first and second upper covers 30A and 30B can be confirmed with the eyes without detaching these upper covers from the base 20.

Figure 5B:
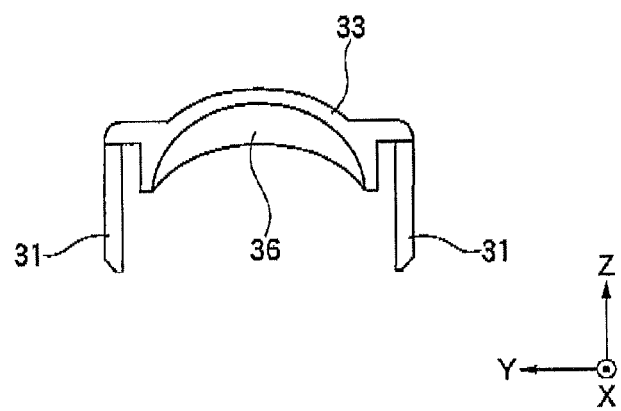
FIG. 5B is a side-elevational view showing the first upper cover (or the second upper cover)
Figure 5C:
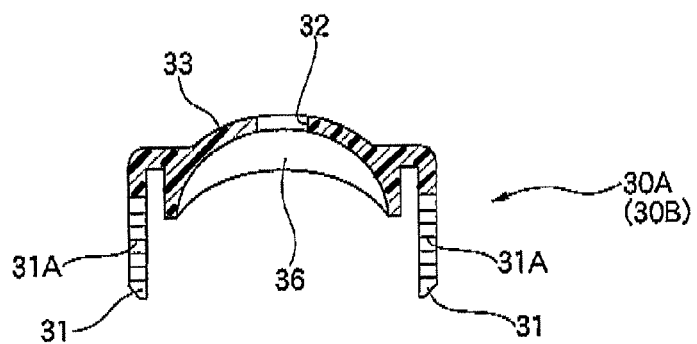
FIG. 5C is a cross-sectional view taken along the line VC-VC of FIG. 4A.

As shown in FIGS. 5B and 5C, the cover body portion 33 of each of the first and second upper covers 30A and 30B has an inverted U-shaped cross-section (generally semi-cylindrical shape) conforming to the shape of the outer peripheral surface of the corrugated tube 40A, 40B so that the cover body portion 33 can be fitted on the upper surface of the corrugated tube 40A, 40B from the upper side. In this embodiment, the cover body portion 33 is formed into a curvature corresponding to the outer diameter of the corrugated tube of the maximum diameter so that the cover body portion 33 can be fitted on any of the corrugated tubes of different diameters from the upper side to cover the same.

When the first upper cover 30A and the second upper cover 30B are to be attached to the base 20, the guide recess portions 34 receive the respective guide bars 25 formed on the base 20, and are moved vertically downward along the respective guide bars 25. Therefore, the four guide recess portions 34 are formed respectively at those portions of the first and second upper covers 30A and 30B corresponding respectively to the guide bars 25. Thanks to the engagement of the guide bars 25 in the respective guide recess portions 34, the insertion of the interconnecting piece portions 31 into the interconnecting piece retaining holes 23A of the respective retaining portions 23 is smoothly guided, and therefore this engaging operation assists in smoothly connecting the first and second upper covers 30A and 30B to the base 20, and besides after the first and second upper covers 30A and 30B are connected to the base 20, this connected condition is reinforced by the above engagement.

The base portion 35 of each of the first and second upper covers 30A and 30B has a flat surface disposed one step lower than the cover body portion 33 and extending therefrom. The base portions 35 of the first and second upper covers 30A and 30B are integrally interconnected by the flexible interconnecting portion 30C.

The cover-side retaining portions 36 are used for completely (secondarily) retaining the corrugated tubes (primarily or provisionally retained by the base-side retaining portions 22 of the base 20) when the first and second upper covers 30A and 30B are closed to be fitted on the corrugated tube end portions 41. The cover-side retaining portions 36 of each of the first and second upper covers 30A and 30B are elastically engaged respectively in the grooves on the bellows-shaped outer surface of the corrugated tube end portion 41 to hold the corrugated tube 40A, 40B, thereby preventing the axial movement of the corrugated tube 40A, 40B.

In this embodiment, each cover-side retaining portion 36 is a projection extending toward the axis of the corrugated tube end portion 41, and has a generally crescent shape (or arcuate shape) and is formed integrally on the top wall portion and opposite side wall portions of the cover body portion 33 over an entire width of the cover body portion 33, as shown in FIGS. 1 and 5. In this embodiment, each cover-side retaining portion 36 includes a cover-side continuous retaining portion formed in a continuous manner on the left side wall portion (FIGS. 5B and 5C) and the top wall portion, and a cover-side continuous retaining portion formed in a continuous manner on the right side wall portion and the top wall portion, and the two cover-side continuous retaining portions are integrally interconnected (that is, are continuous with each other) at the top wall portion.

Next, the operation for interconnecting the end portions 41 of the two corrugated tubes 40A and 40*b* by the use of the holder 10 of this embodiment will be described.

The interconnecting operation effected by the holder 10 includes a first operation for fixing the end portions 41 of the two corrugated tubes 40A and 40B by the base 20, and a second operation for mounting the first upper cover 30A and the second upper cover 30B on the base 20 in such a manner that the first and second upper covers 30A and 30B are fitted respectively on the end portions 41 of the corrugated tubes 40A and 40B from the upper side to fix these end portions 41. Although the base 20 is beforehand fixed to the mounting member (not shown) such as a panel by inserting the fixing portion 24 into the mounting hole in the mounting member, this fixing operation may be effected after the above second operation is finished.

(I) First Operation

First, the end portions 41 of the two corrugated tubes 40A and 40B are located near respectively to the pair of holding portions 21 of the base 20 as shown in FIG. 1, and are disposed in such a condition that the terminal edge portion of each end portion 41 is just about to be inserted into a gap between the elastic holding piece portion 27 and the floor portion 21A of the holding portion 21. Then, the end portion 41 of each corrugated tube 40A, 40B is inserted into this gap, and then this end portion 41 is pushed to be moved toward the inner end of the holding portion 21 in the axial direction of the base 20. As a result, this end portion 41 is moved toward the central portion of the base 20 while the ridges and grooves on the bellows-shaped inner surface of the end portion 41 are sequentially brought into engagement with the retaining claw 27A of the elastic holding piece portion 27.

When the end portion 41 of each corrugated tube 40A, 40B is finally brought into abutting engagement with a proximal end portion 27B of the elastic holding piece portion 27 extending vertically upwardly from the floor portion 21A, the axial movement of the end portion 41 is stopped. As a result, the corrugated tube 40A, 40B is disposed in the provisionally-retained condition in which the retaining claw 27A of the elastic holding piece portion 27 is engaged in the groove on the bellows-shaped inner surface of the end portion 41. At the same time, the first base-side retaining portions 221 and second base-side retaining portions 222 of the base-side retaining portions 22 (formed in a continuous manner on and projecting from the floor portion 21A and side wall portions 21B of each holding portion 21) are fitted or engaged in the grooves on the bellows-shaped outer surface of the end portion 41 of the corrugated tube 40A, 40B, so that the corrugated tube 40A, 40B is primarily retained on the base 20.

Namely, each relevant groove on the bellows-shaped outer surface of each corrugated tube 40A, 40B is retained at two points α and β by the corresponding base-side retaining portion 22 and the elastic holding piece portion 27 (see FIGS. 7B and 7C, but at this time, the upper cover shown in these Figures is not yet fitted on the corrugated tube), and the corrugated tube is held relative to the base 20 without displacement. For the sake of convenience, here, although the operations for respectively holding the corrugated tubes 40A and 40B have been described at the same time, it is common to first hold one of the two corrugated tubes on the base 20 and then to hold the other corrugated tube on the base 20.

(II) Second Operation

Next, the operation for secondarily (that is, completely) retaining the corrugated tubes 40A and 40B in such a manner that the first and second upper covers 30A and 30B cover the respective corrugated tubes 40A and 40B from the upper side will be described.

In FIG. 1, each of the first upper cover 30A and the second upper cover 30B is located just above the base 20, and then is moved downward (in a direction (−Z)). At this time, each corrugated tubes 40A, 40B is already retained at the two points relative to the base 20 by each base-side retaining portion 22, and is primarily retained without displacement, and therefore merely by positioning each upper cover 30A, 30B relative to the base 20 and connecting the upper cover to the base 20, the corrugated tube 40A, 40B can be secondarily retained on the base 20, that is, can be completely held on the holder 10.

Namely, for mounting each of the first upper cover 30A and the second upper cover 30B on the base 20, it is only necessary to locate the interconnecting piece portions 31 of each upper cover 30A, 30B just above the interconnecting piece retaining holes 23A of the respective retaining portions 23 of the base 20 and then to push the upper cover 30A, 30B to move the same toward the base 20 while moving the guide recess portions 34 of the upper cover 30A, 30B along the respective guide bars 25.

Figure 7A:
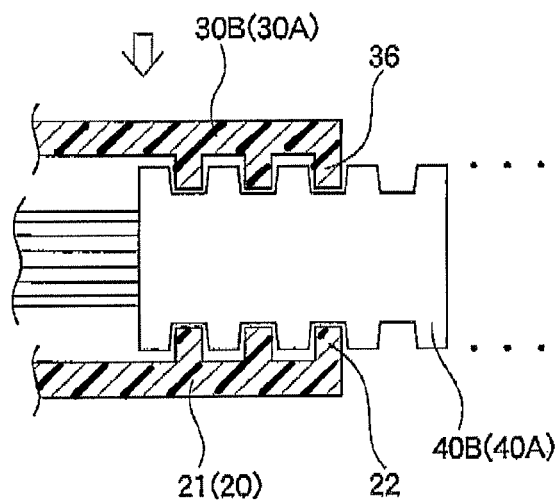
FIG. 7A is a view showing a condition in which the corrugated tube is secondarily (completely) retained by the base and the first upper cover (or the second upper cover)

By this pushing operation shown in FIG. 7A, each interconnecting piece portion 31 is moved downward within the interconnecting piece retaining hole 23A, and also each guide recess portion 34 is moved downward along the guide bar 25, and the cover body portions 33 of the first and second upper covers 30A and 30B are brought into abutting engagement respectively with the upper surfaces of the corrugated tubes 40A and 40B independently of each other. Therefore, the groove on the bellows-shaped surface of the corrugated tube end portion 41 is retained at one point γ (that is, at its uppermost portion) by each cover-side retaining portion 36 (see FIGS. 7B and 7C).

As a result, the lower half portion of each corrugated tube 40A and 40B is provisionally retained by the elastic holding piece portion 27, and also is retained at the two (left and right) points α and β of each base-side retaining portion 22, while the upper half portion of each corrugated tube is retained at one uppermost point by each cover-side retaining portion 36. In other words, the corrugated tube is supported at the three points α, β and γ in the circumferential direction, and is firmly completely (that is, secondarily) retained (see FIGS. 7B and 7C).

Namely, simultaneously when the retaining projection 31A of each interconnecting piece portion 31 of each upper cover 30A, 30B is retainingly engaged with the retaining claw 23B of the corresponding retaining portion 23, the cover-side retaining portions 36 of the upper cover 30A, 30B are fitted into the uppermost portions of the respective grooves on the bellows-shaped outer surface of the end portion 41 of the corrugated tube 40A, 40B. As a result, the end portion 41 of the corrugated tube 40A, 40B is secondarily (that is, completely) retained at the two points α and β of each base-side retaining portion 22 and also at the one point γ of each cover-side retaining portion 36, and therefore is retained at the three points in the circumferential direction as described above, so that the corrugated tube 40A, 40B is positively held by the holder 10 (see FIG. 8).

Figure 7B:
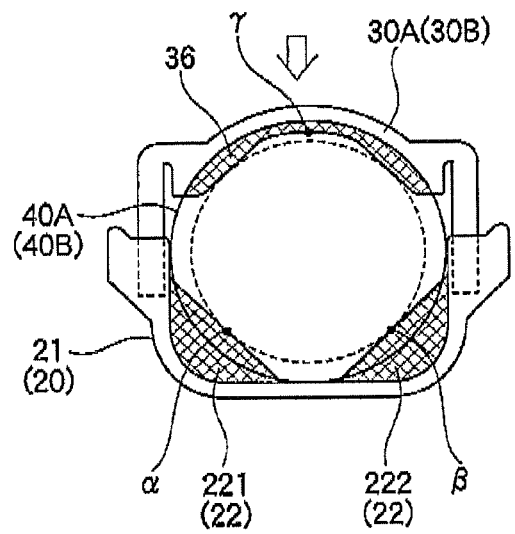
FIG. 7B is a view showing a condition in which the corrugated tube of a larger diameter is completely retained.
Figure 7C:
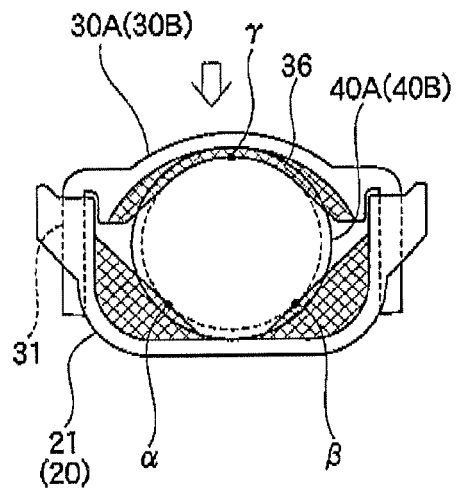
FIG. 7C is a view showing a condition in which the corrugated tube of a smaller diameter is completely retained.

In this manner, each corrugated tube 40A, 40B is positively held by the holder 10, and regardless of whether both of the corrugated tubes 40A and 40B have the larger-diameter as shown in FIG. 7B or have the smaller-diameter as shown in FIG. 7C, each corrugated tube 40A, 40B is secondarily (that is, completely) retained at the three points in the circumferential direction, that is, at the two points α and β of each base-side retaining portion 22 and also at the one point γ of each cover-side retaining portion 36, and therefore can be positively held by the holder 10.

Furthermore, in this embodiment, even when one of the corrugated tubes 40A and 40B has the larger outer diameter while the other has the smaller outer diameter, the flexible interconnecting portion 30C can be flexed into an inclined condition, and therefore the distance (connecting distance) between the first upper cover 30A and the base 20 and the distance (connecting distance) between the second upper cover 30B and the base 20 can be changed independently of each other. With this construction, the connecting distance of each of the first upper cover 30A and the second upper cover 30B relative to the base 20 can be adjusted so as to correspond to the outer diameter of either of the corrugated tubes 40A and 40B of different diameters.

Therefore, in this case, also, each relevant groove on the bellows-shaped surface of each corrugated tube 40A, 40B is secondarily retained at the three points in the circumferential direction, that is, at the two points α and β of each base-side retaining portion 22 and also at the one point γ of each cover-side retaining portion 36 as described above, and therefore the corrugated tubes 40A and 40B of different diameters can be positively held by the holder 10.

Second Embodiment

Next, a second embodiment of the present invention will be described. In this embodiment, those portions identical to the corresponding portions of the first embodiment will be designated by identical reference numerals, respectively, and detailed explanation thereof will be omitted.

A holder 60 of this embodiment differs from the holder 10 of the first embodiment in that each cover-side retaining portion 36 of each of first and second upper covers 30A and 30B is interrupted at its central portion, and includes a cover-side continuous retaining portion (first cover-side continuous is retaining portion 361) formed in a continuous manner integrally on one side wall portion and a top wall portion of a cover body portion 33, and a cover-side continuous retaining portion (second cover-side continuous retaining portion 362) formed in a continuous manner integrally on the other side wall portion and the top wall portion of the cover body portion 33, the two cover-side continuous retaining portions 361 and 361 being separated from each other at the top wall portion.

Next, an operation for interconnecting end portions 41 of two corrugated tubes 40A and 40b by the use of the holder 60 of this embodiment will be described.

In this embodiment, also, the interconnecting operation effected by the holder 60 includes a first operation and a second operation as described above for the first embodiment. A base 20 of the holder 60 is identical in construction to the base 20 of the first embodiment, and therefore the first operation is the same as the first operation of the first embodiment. Therefore, the second operation will be described below.

(II) Second Operation

The operation for secondarily (that is, completely) retaining the corrugated tubes 40A and 40B in such a manner the first and second upper covers 30A and 30B cover the respective corrugated tubes 40A and 40B from the upper side will be described.

Figure 9:
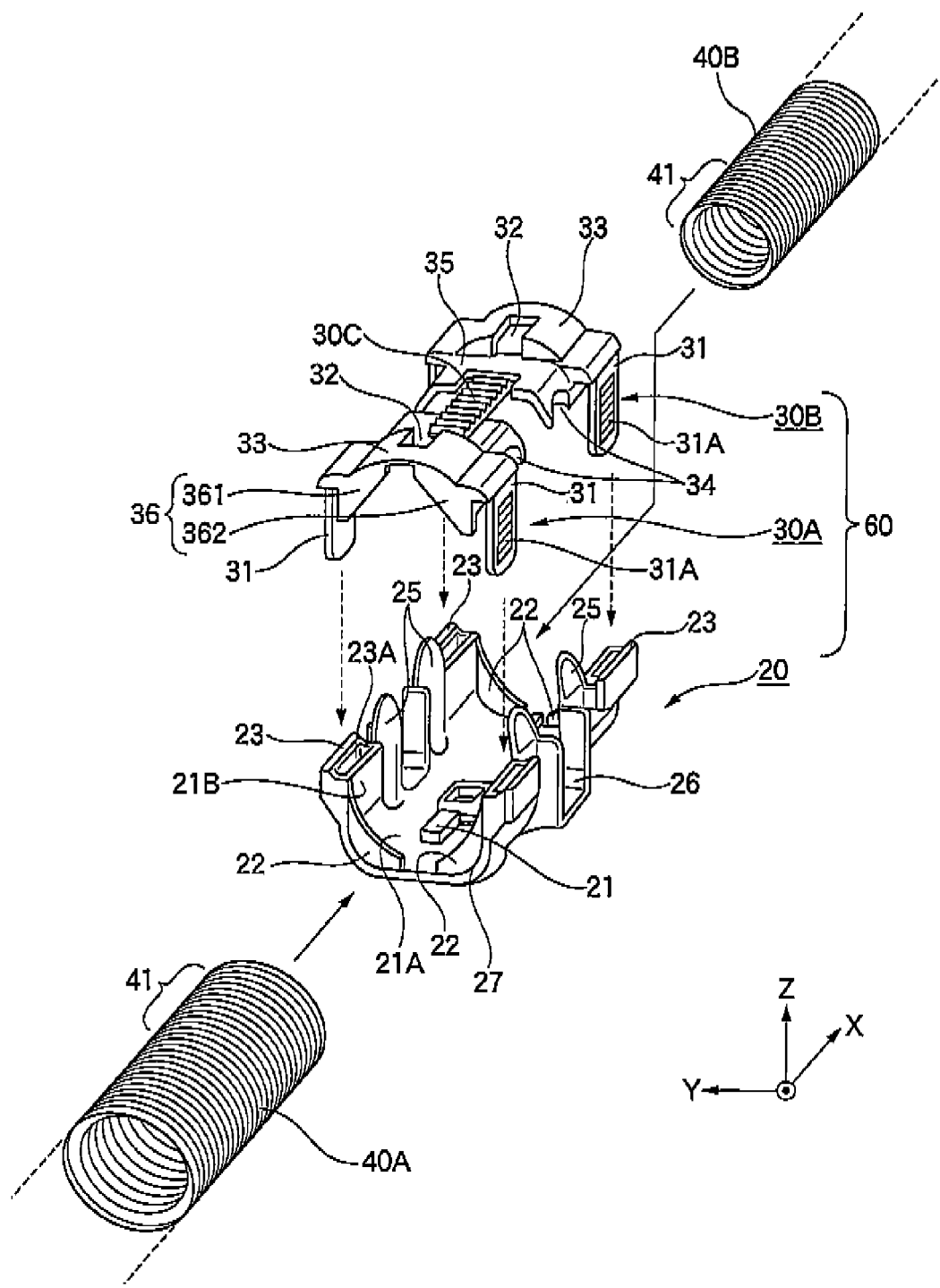
FIG. 9 is a perspective view showing a second embodiment of a holder of the invention and corrugated tubes.

In FIG. 9, each of the first upper cover 30A and the second upper cover 30A is located just above the base 20, and then is moved downward (in a direction (−Z)). At this time, each corrugated tubes 40A, 40B is already retained at two points of each base-side retaining portion 22 relative to the base 20, and is primarily retained without displacement, and therefore merely by positioning each upper cover 30A, 30B relative to the base 20 and connecting the upper cover 30A, 30B to the base 20, the corrugated tube 40A, 40B can be secondarily retained on the base 20, that is, can be completely held on the holder 60.

Namely, for mounting each of the first upper cover 30A and the second upper cover 30B on the base 20, it is only necessary to locate interconnecting piece portions 31 of each upper cover 30A, 30B just above interconnecting piece retaining holes 23A of respective retaining portions 23 of the base 20 and then to push the upper cover 30A, 30B to move the same toward the base 20 while moving guide recess portions 34 of the upper cover 30A, 30B along respective guide bars 25, as described above for the first embodiment.

Figure 10A:
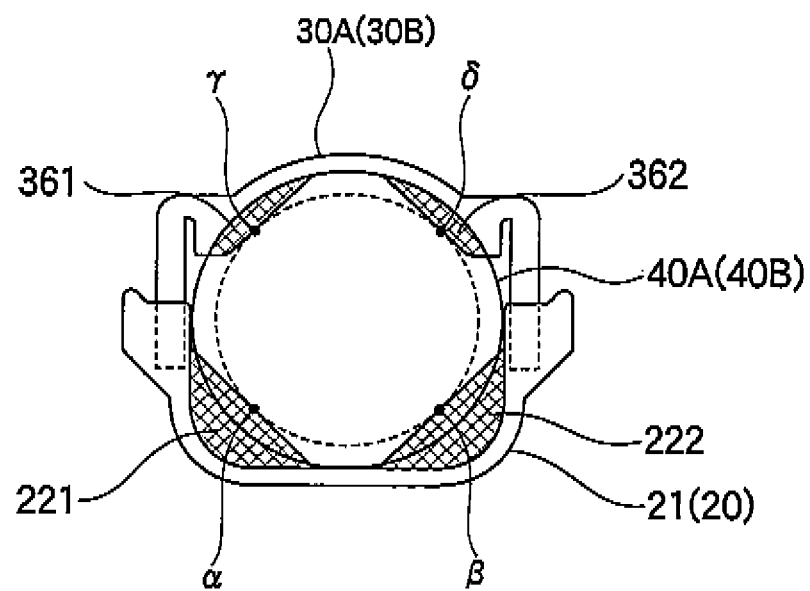
FIG. 10A is a view showing a condition in which the corrugated tube of a larger diameter is completely retained by a base and a first (or a second) upper cover of the holder of the second embodiment.
Figure 10B:
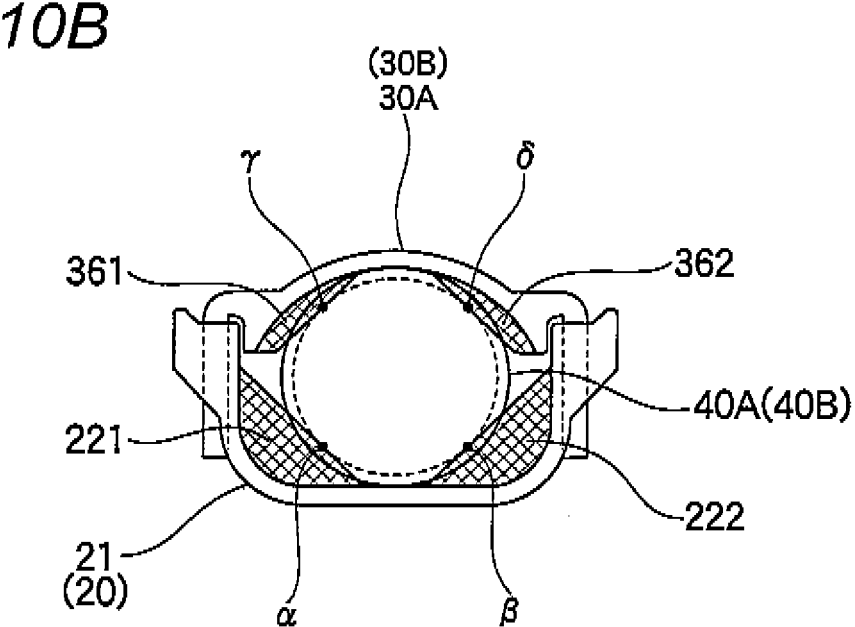
FIG. 10B is a view showing a condition in which the corrugated tube of a smaller diameter is completely retained.

By this pushing operation shown, each interconnecting piece portion 31 is moved downward within the interconnecting piece retaining hole 23A, and also each guide recess portion 34 is moved downward along the guide bar 25, and the cover body portions 33 of the first and second upper covers 30A and 30B are brought into abutting engagement respectively with the upper surfaces of the corrugated tubes 40A and 40B independently of each other. Therefore, the groove on the bellows-shaped surface of the end portion 41 of each corrugated tube is retained not at one point (its uppermost portion) but at two points γ and α (disposed respectively at opposite sides of this uppermost portion) by each cover-side retaining portion 36 as shown in FIG. 10.

As a result, the lower half portion of each corrugated tube 40A and 40B is provisionally retained by an elastic holding piece portion 27, and also is retained at two (left and right) points α and β of each base-side retaining portion 22, while the upper half portion of each corrugated tube is retained at two (left and right) points γ and δ by each cover-side retaining portion 36. In other words, each corrugated tube 40A, 40B is supported at the four points α, β, γ and δ in the circumferential direction, and is firmly completely (that is secondarily) retained.

Namely, a retaining projection 31A of each interconnecting piece portion 31 of each upper cover 30A, 30B is retainingly engaged with a retaining claw 23B of the corresponding retaining portion 23, and therefore the first cover-side continuous retaining portion 361 and second cover-side continuous retaining portion 362 of each cover-side retaining portions 36 of the upper cover 30A, 30B are fitted into the groove on the bellows-shaped outer surface of the end portion 41 of the corrugated tube 40A, 40B, and are engaged with the end portion 41 respectively at the two (left and right) points. As a result, the end portion 41 of the corrugated tube 40A, 40B is secondarily (that is, completely) retained at the two points of each base-side retaining portion 22 and also at the two points of each cover-side retaining portion 36, and therefore is retained at the four points in the circumferential direction, so that the corrugated tube 40A, 40B is positively held by the holder 60 (see FIG. 10).

In this manner, each corrugated tube 40A, 40B is positively held by the holder 60, and regardless of whether both of the corrugated tubes 40A and 40B have the larger-diameter or have the smaller-diameter or even when one of the corrugated tubes 40A and 40B has the larger outer diameter while the other has the smaller outer diameter, each corrugated tube 40A, 40B is secondarily (that is, completely) retained at the four points in the circumferential direction, that is at the two points of each base-side retaining portion 22 and also at the two points of each cover-side retaining portion 36, and therefore the corrugated tubes of different diameters can be positively held by the holder 60.

Furthermore, in this embodiment, even when one of the corrugated tubes 40A and 40B has the larger outer diameter while the other has the smaller outer diameter, a flexible interconnecting portion 300 can be flexed into an inclined condition, and therefore the distance (connecting distance) between the first upper cover 30A and the base 20 and the distance (connecting distance) between the second upper cover 30B and the base 20 can be changed independently of each other. With this construction, the connecting distance of each of the first upper cover 30A and the second upper cover 30B relative to the base 20 can be adjusted so as to correspond to the outer diameter of either of the corrugated tubes 40A and 40B of different diameters.

The present invention is not limited to the above embodiments, and various modifications can be made.

For example, in the first and second embodiments, although the plurality of base-side retaining portions are formed on the base, only two base-side retaining portions may be formed, for example, at the opposite end portions of the base, respectively. With respect to the cover-side retaining portions, only two cover-side retaining portions may be formed, for example, at the outer end portions of the first and second upper covers, respectively.

Third Embodiment

Next, a third embodiment of the present invention will be described.

Figure 11:
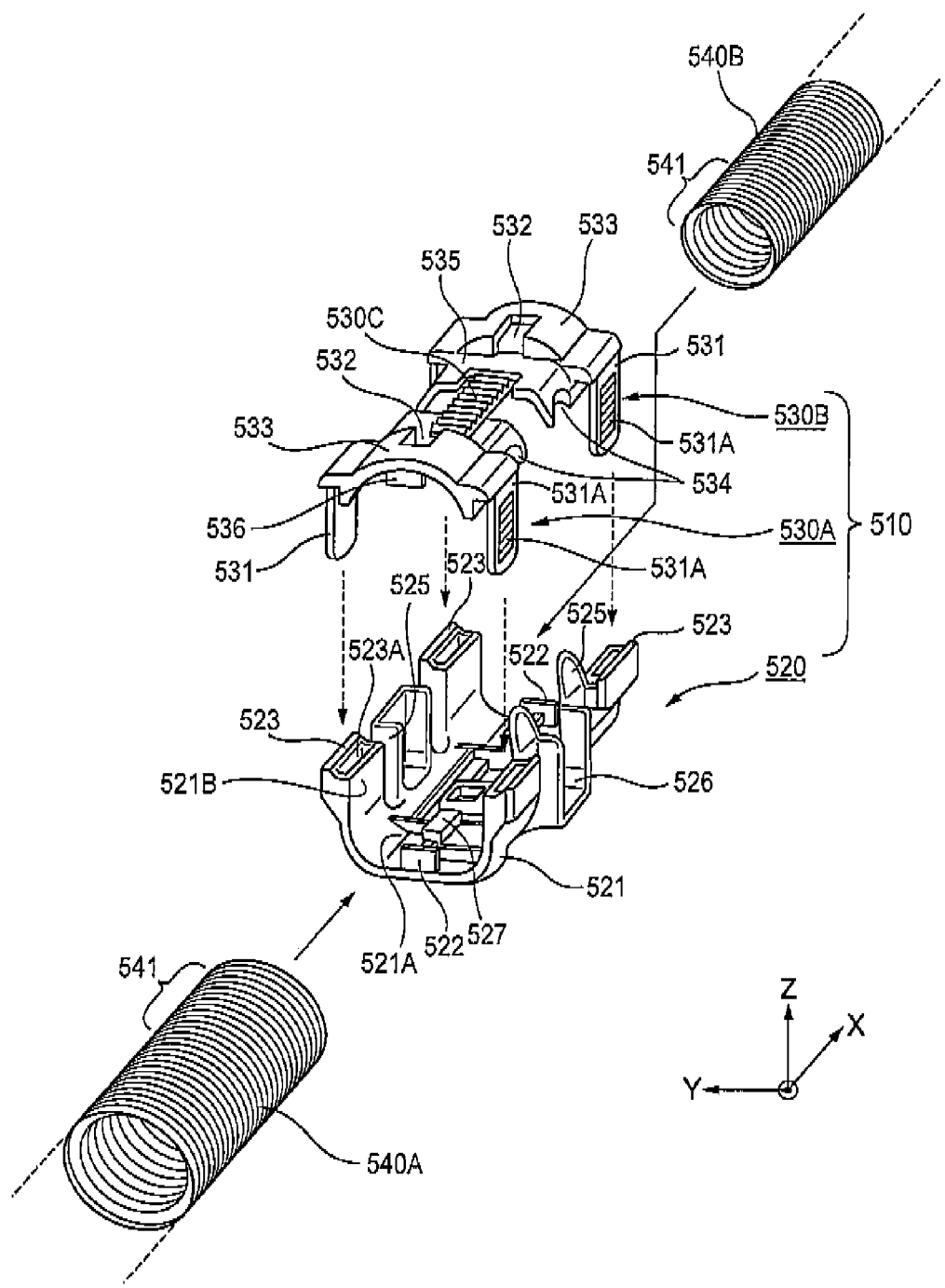
FIG. 11 is a perspective view showing a third embodiment of a holder of the present invention and corrugated tubes.

As shown in FIG. 11, a holder 510 functions as a protector for interconnecting corrugated tubes 540A and 540B of the same diameter or different diameters. The holder 510 includes two parts, that is, a base 520 and a cover unit including the first upper cover 530A and the second upper cover 530B interconnected by a flexible interconnecting portion 530. The base 520 is formed into a one-piece construction by a (rigid) synthetic resin, and also the cover unit is formed into a one-piece construction by a (rigid) synthetic resin. Although only end portions 541 of the corrugated tubes 540A and 540B are mainly shown in FIG. 11 for description purposes, each corrugated tube is actually formed long, and is adapted to receive, for example, a bundle 550 of wires therein to protect the same, and is adapted to be arranged or installed, for example, on a body panel of an automobile according to a predetermined layout.

As shown in FIG. 11 and FIGS. 12 to 15, the base 520 is adapted to hold a lower surface and opposite side surfaces of each of the two corrugated tubes 540A and 540B. The base 520 includes a pair of holding portions 521 formed respectively at opposite (front and rear) end portions thereof spaced from each other in a longitudinal direction X, first base-side retaining portions (hereinafter referred to as "base-side retaining portions") 522 formed respectively at the longitudinally-opposite ends of the base 520, retaining portions 523 formed respectively at opposite side portions (spaced from each other in a transverse direction V perpendicular to the longitudinal direction X) of each of the opposite (front and rear) end portions of the base 520, a fixing portion 524 projecting downwardly from a longitudinally-central portion of a bottom of the base 520, two pairs of guide bars 525 provided between the holding portions 521 and disposed respectively at front and rear sides of the central portion of the base 520, and a pair of right and left branch wire lead-out portions 526 formed respectively at the transversely-opposite side portions of the base 520 at the longitudinally-central portion thereof.

The holding portions 521 are formed into such a shape as to respectively receive the end portions 541 of the corrugated tubes 540A and 540B (which are to be interconnected) to support the outer peripheral surfaces of the end portions 541, respectively. In this embodiment, each of the holding portions 521 includes a floor portion 521A for supporting the end portion 541 of the corrugated tubes 540A, 540B from the lower side thereof, and a pair of right and left side wall portions 521B extending upwardly respectively from opposite side edges of the floor portion 521A so as to support the end portion 541 laterally. The holding portion 521, when viewed from the end thereof, has a generally U-shape as shown in FIGS. 15A and 15B.

Figure 12:
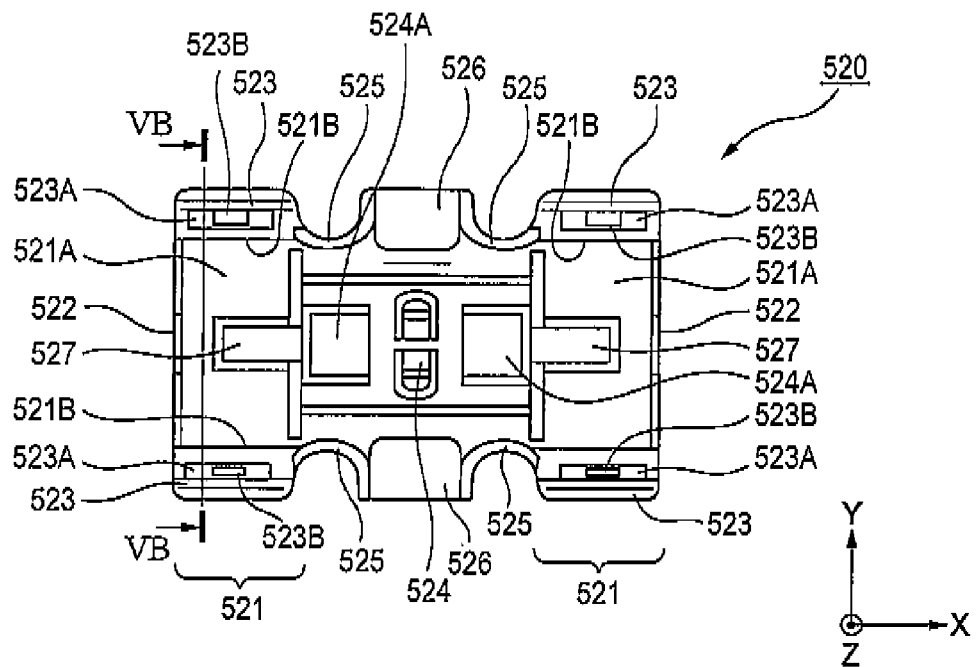
FIG. 12 is a plan view showing a base of the holder.

As shown in FIG. 12, a pair of elastic holding piece portions 527 are formed on and project respectively from the inner surfaces of the holding portions 521, and extend axially respectively toward the outer ends of the holding portions 521. Before the end portions 541 of the corrugated tubes 540A and 540B received in the respective holding portions 521 are covered respectively by the inner surfaces of the first and second upper covers 530A and 530B, each elastic holding piece portion 527 intrudes into the inside of the end portion 541 of the corrugated tube 540A, 540B and is elastically engaged in a groove on the bellows-shaped inner surface of the end portion 541, thereby provisionally retaining the corrugated tube 540A, 540B on the base 520 as will be more fully described later. In this embodiment, each elastic holding piece portion 527 has a generally recumbent L-shape, and first projects upwardly from the floor portion 521A of the holding portion 521 to a height equal to or slightly larger than the height of the grooves on the bellows-shaped inner surface of the corrugated tube end portion 541, and then extends at this height toward the outer end of the holding portion 521 (see FIGS. 8A and 8B). A retaining claw 527A for being elastically fitted in the groove on the bellows-shaped inner surface of the corrugated tube end portion 541 is formed at a distal end portion of the elastic holding piece portion 527.

The base-side retaining portions 522 are used for completely retaining the corrugated tubes 540A and 540B (when the upper covers are closed) after the corrugated tubes are provisionally retained by the elastic holding piece portions 527. Namely, these base-side retaining portions 522 are elastically fitted into respective grooves on the bellows-shaped outer surfaces of the end portions 541 of the corrugated tubes 540A and 540B to be engaged in the grooves, and hold or retain the corrugated tubes 540A and 540B on the base 520, thereby preventing the axial movement of the corrugated tubes 540A and 540B. Each base-side retaining portion 522 is a projection protecting from the floor portion 521A of the corresponding holding portion 521 toward the axis of the end portion of the corrugated tube 540A, 540B. In this embodiment, each base-side retaining portion 522 projects upwardly from the floor portion 521A of the holding portion 521.

Figure 22:
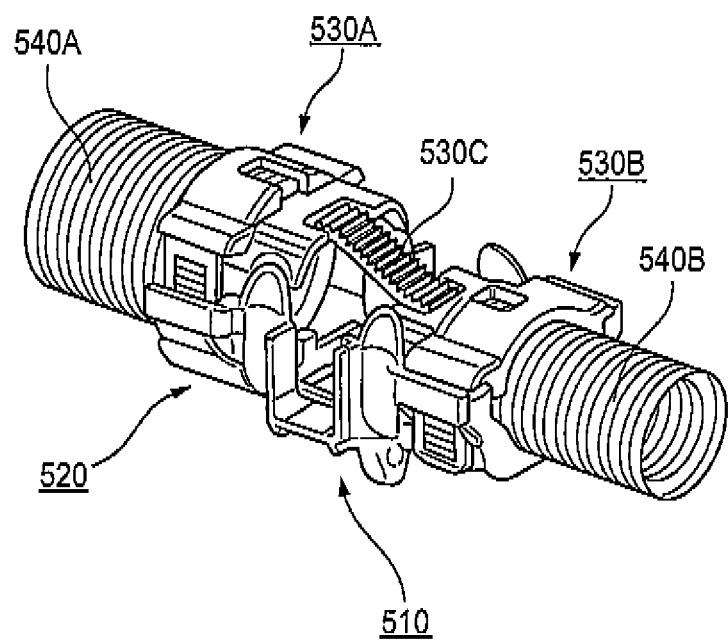
FIG. 22 is a perspective view showing a condition in which two corrugated tubes of different diameters are connected together by the holder.

The four retaining portions 523 are formed respectively on outer surfaces of the four side wall portions 521B of the pair of holding portions 521, and have a generally rectangular tubular shape. The four retaining portions 523 have respective interconnecting piece retaining holes 523A for respectively receiving interconnecting piece portions 531 of the first and second upper covers 530A and 530B. In this embodiment, the four retaining portions 523 are formed respectively at four corner portions of the base 520, and an elastic retaining claw 523B is formed in a projecting manner within the interconnecting piece retaining hole 523A of each retaining portion 523 as shown in FIG. 22.

Figure 13:
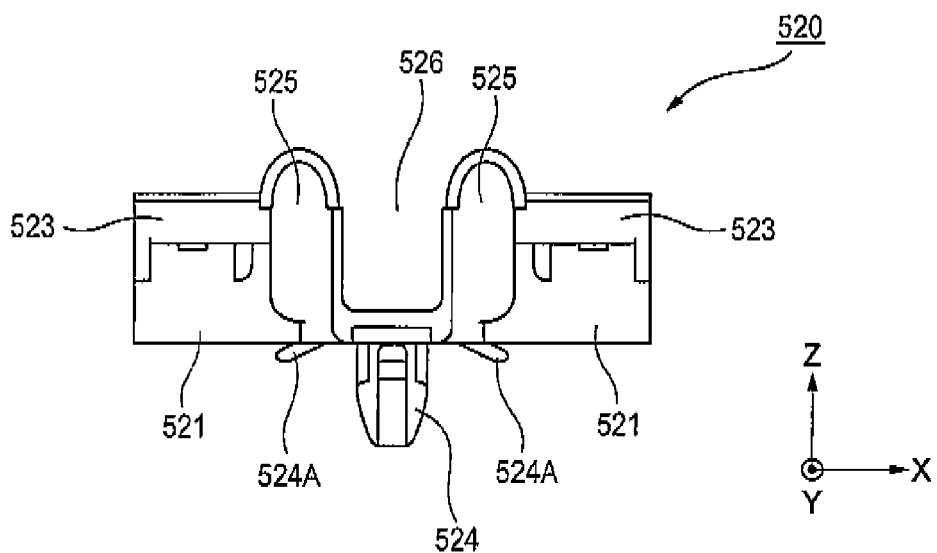
FIG. 13 is a front-elevational view of the base.

The fixing portion 524 shown in FIG. 13 is adapted to be mounted on a mounting member (not shown) such as a panel, and in this embodiment the fixing portion 524 serving as fixing means is inserted into a mounting hole in the mounting member to be fixed thereto. In the illustrated embodiment, although this fixing portion 524 has an anchor-shape, it can be replaced by any other suitable fixing means for being pushed into a mounting hole in the mounting member to be fixed thereto, and for example the fixing portion 524 may be replaced by fixing means which is fixed to the mounting member and is engaged with a button-type stud (T-stud) for fixing purposes.

The four guide bars 525 have a generally semi-cylindrical shape (that is, have a generally arc-shaped transverse cross-section), and are formed adjacent respectively to the four side wall portions 521B of the pair of holding portions 521 and are upstanding in parallel relation to the side wall portions 521B. The guide bars 525 serve to guide the first and second upper covers 530A and 530B so as to keep them in a proper posture at the time of connecting the first and second upper covers 530A and 530B to the base 520. Although it is not essential to provide the guide bars 525, the provision of these guide bars 525 enables this cover connecting operation to be smoothly and positively carried out. In the illustrated embodiment, although the guide bars 525 have the generally semi-cylindrical shape, these guide bars 525 can have any other suitable shape in so far as they can properly guide the covers 530A and 530B.

The branch wire lead-out portions 526 are provided for the leading-out of desired wires of the wire bundle (extending outwardly from the end portions 541 of the corrugated tubes 540A and 540B) therethrough. Even after the first and second upper covers 530A and 530B are connected to the base 520 to cover the respective corrugated tubes, the branch wire lead-out portions 526 are kept in an open condition.

Figure 14:
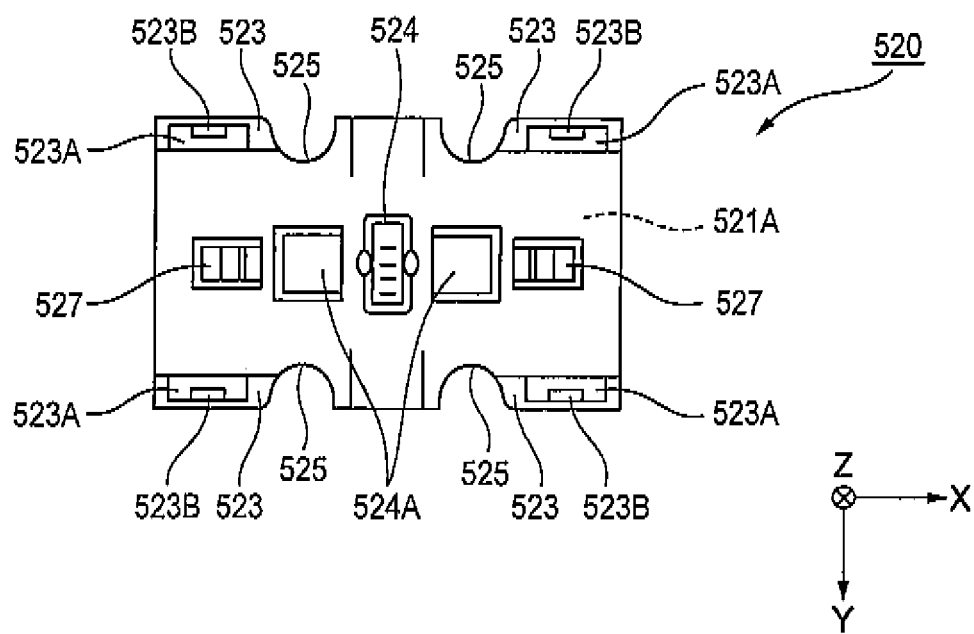
FIG. 14 is a bottom view of the base.
Figure 16A:
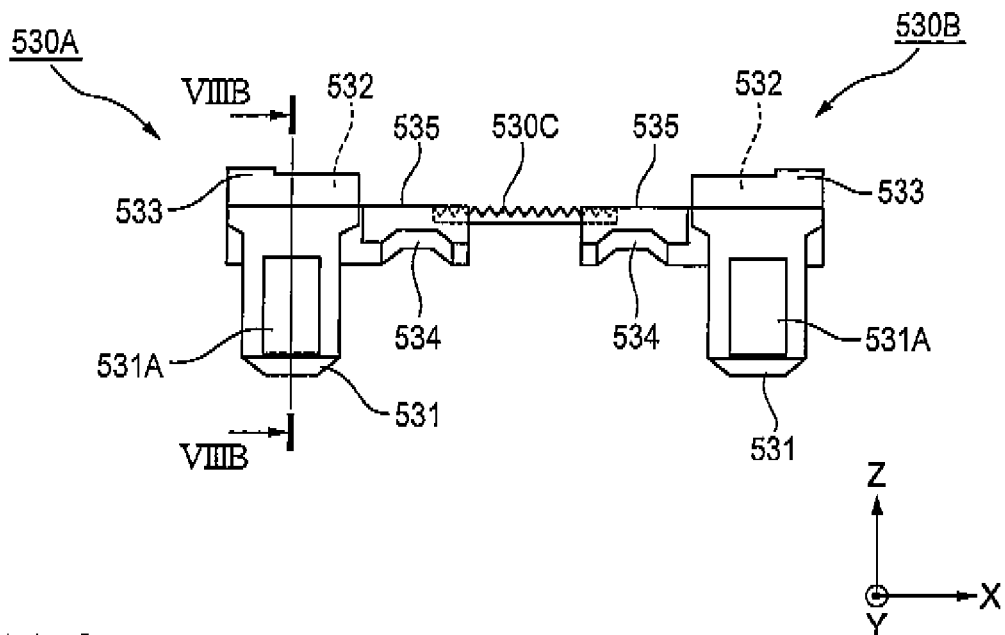
FIG. 16A is a front-elevational view showing a cover unit including a first upper cover, a second upper cover and a flexible interconnecting portion.
Figure 16B:
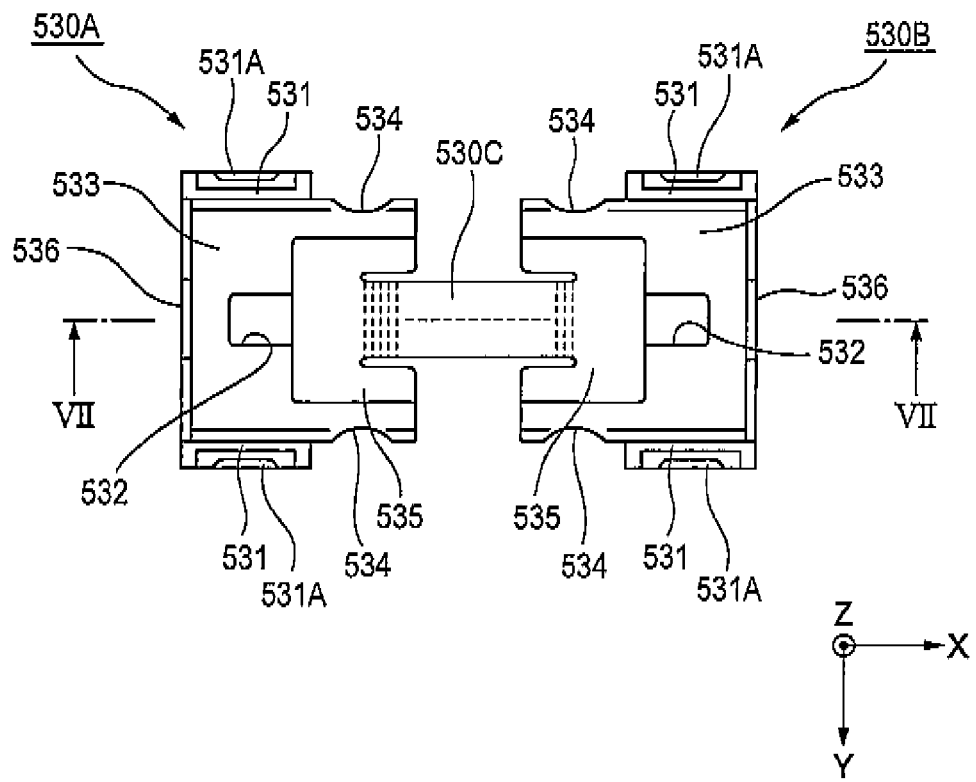
FIG. 16B is a bottom view thereof.
Figure 17:
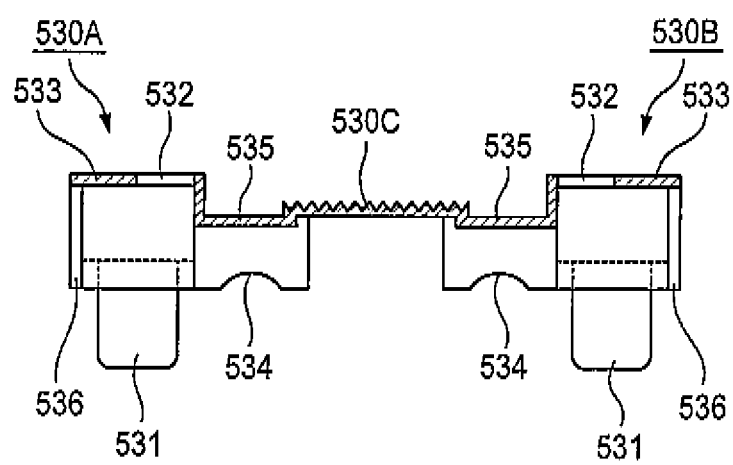
FIG. 17 is a longitudinal cross-sectional view of the cover unit.
Figure 18A:
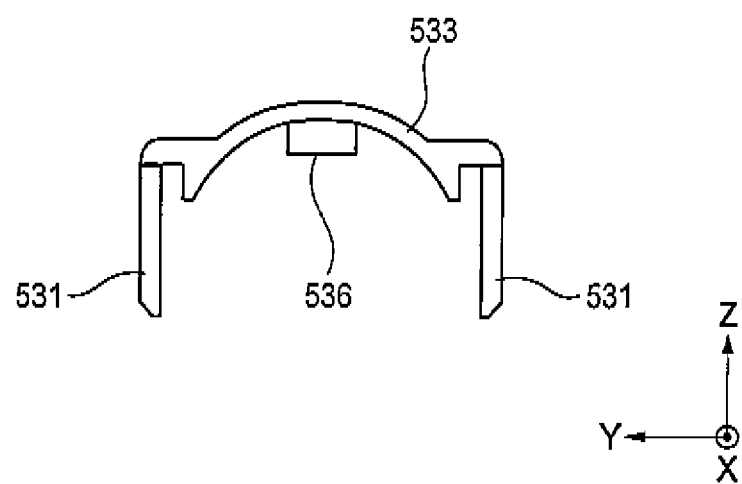
FIG. 18A is a side-elevational view of the cover unit.
Figure 18B:
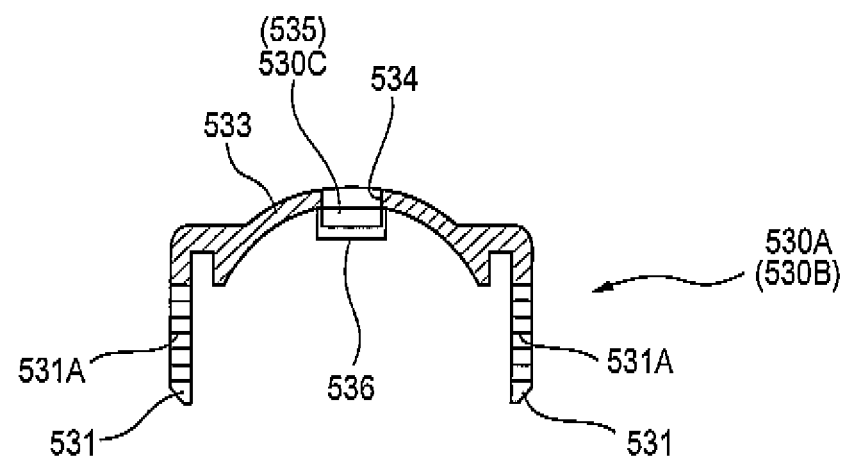
FIG. 18B is a cross-sectional view taken along the line VIIIB-VIIIB of FIG. 16A.

On the other hand, the first upper cover 530A and the second upper cover 530B are integrally interconnected by the flexible interconnecting portion 530C of a flexible nature as shown in FIGS. 11, 14 and 15. The first and second upper covers 530A and 530B cover the open top of the base 520, and completely (secondarily) retain the respective corrugated tubes 540A and 540B provisionally retained on the base 520.

Each of the first and second upper covers 530A and 530B includes a cover body portion 533 having the interconnecting piece portions 531 and a position confirmation opening 532, a base portion 535 having guide recess portions 534, and a cover-side retaining portion 536.

The flexible interconnecting portion 530C has a generally bellows-shape so that when the two corrugated tubes 540A and 540B to be connected together are different in diameter from each other (see FIGS. 22 and 24), the flexible interconnecting portion 530C can be inclined to allow (or absorb) the difference in height (relative to the base 520) between the base portions 535 of the first and second upper covers 530A and 530B due to the difference in outer diameter between the two corrugated tubes 540A and 540B. The first and second upper covers 530A and 530B can cover the two corrugated tubes 540A and 540B, respectively, from the upper side while only the flexible interconnecting portion 530C is kept in an inclined condition. Also, when the two corrugated tubes 540A and 540B have the same diameter (see FIG. 21), the first and second upper covers 530A and 530B cover the two corrugated tubes 540A and 540B, respectively, from the upper side while the flexible interconnecting portion 530C is kept in a horizontal posture.

Figure 24:
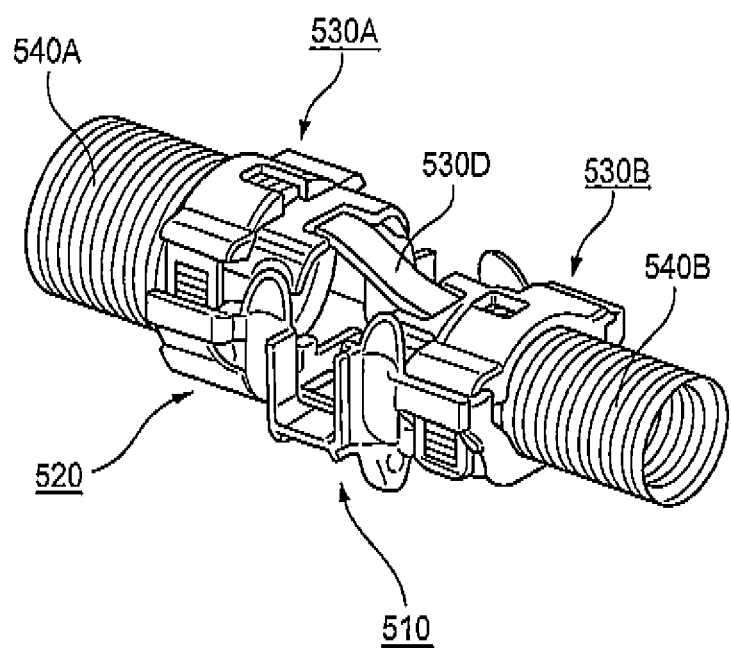
FIG. 24 is a perspective view showing a modified holder of the invention.
Figure 26A:
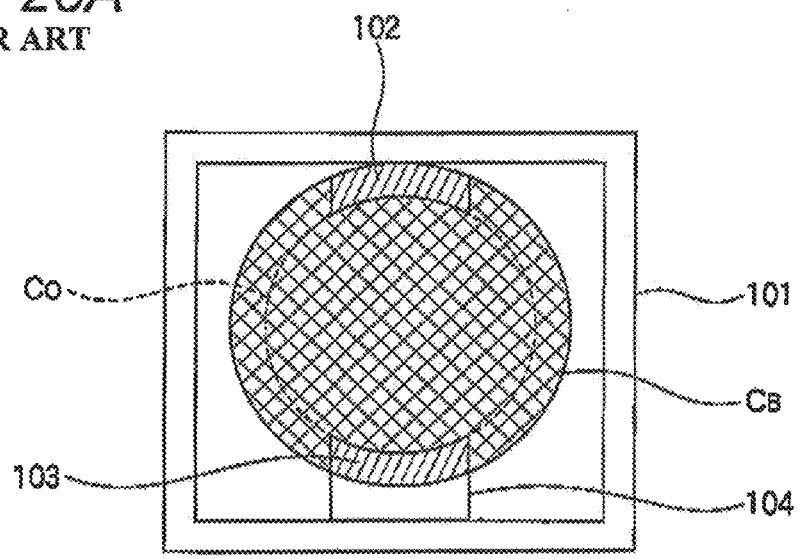
FIG. 26A is a view showing a condition in which a corrugated tube of a larger diameter is completely retained by the conventional holder.
Figure 26B:
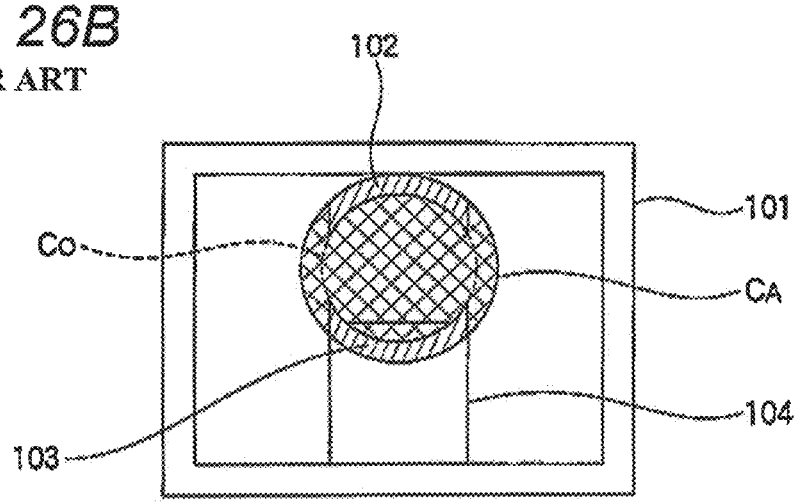
FIG. 26B is a view showing a condition in which a corrugated tube of a smaller diameter is completely retained by the conventional holder.

The flexible interconnecting portion 530C is not limited to the bellows-shape as shown in this embodiment, and can be of any other suitable construction in so far as the first and second upper covers 530A and 530B can positively cover the two corrugated tubes 540A and 540B, respectively, from the upper side to fix them regardless of whether the two corrugated tubes 540A and 540B to be connected together have the same diameter or different diameters. Therefore, for example, a thin plate-like flexible interconnecting portion 530D may be molded integrally with the first and second upper covers 530A and 530B as shown in FIG. 24.

In this embodiment, although the flexible interconnecting portion 530C is integrally molded with the first and second upper covers 530A and 530B, using a suitable synthetic resin, the cover unit may be formed by a method in which separate first and second upper covers and a separate flexible interconnecting portion are prepared, and then opposite end portions of this flexible interconnecting portion are releasably connected to the first and second upper covers to be fixed thereto by suitable means (not shown). In another modified example, a flexible interconnection portion is integrally molded with the base portion 535 of one of the first and second upper covers, and a free end portion of this flexible interconnecting portion is releasably connected to the other upper cover.

The interconnecting piece portions 531 are connected to the base 520 when covering the two corrugated tubes 540A and 540B (primarily or provisionally retained on the base 520) respectively with the upper covers 530A and 530B to the base 520. The first and second upper covers 530A and 530B can be attached to the base 520 by the interconnecting piece portions 531. The interconnecting piece portions 531 are inserted respectively into the interconnecting piece retaining holes 523A of the retaining portions 523, and are retained respectively by the retaining claws 523B, and by doing so, the first upper cover 530A and the second upper cover 530B can be independently fastened to the base 520 to be integrally connected thereto.

Each interconnecting piece portion 531 is formed into a leg-shape so as to be inserted into the interconnecting piece retaining hole 523A. The amount of insertion of each interconnecting piece portion 531 into the interconnecting piece retaining hole 523A of the retaining portion 523 is adjusted according to the size of the outer diameter of the corresponding corrugated tube 540A, 540B. In this embodiment, a plurality (or row) of retaining projections 531A for retaining engagement with the retaining claw 523B in the interconnecting piece retaining hole 523A are formed on the interconnecting piece portion 531, and are arranged at equal intervals in the longitudinal direction of the interconnecting piece portion 531.

Preferably, retaining portions of the retaining projections 531A for retaining engagement with the retaining claw 523B are formed as ratchet teeth, and with this construction when the interconnecting piece portion 531 is inserted into a desired position within the interconnecting piece retaining hole 523A, the interconnecting piece portion 531 is held or retained in this position, thereby positively maintaining the completely-retained condition. When the left and right corrugated tubes 540A and 540B of different diameters are to be connected together as shown in FIG. 11, the amount of insertion of the interconnecting piece portions 531 of the first upper cover 530A and the amount of insertion of the interconnecting piece portions 531 of the second upper cover 530B are adjusted independently of each other, and by doing so, the end portions 541 of the corrugated tubes of different diameters can be positively retained in such a manner that the upper surfaces of the end portions 541 of the corrugated tubes of different diameters are positively held respectively against top wall portions of the cover body portions 533 of the first and second upper covers 530A and 530B.

The position confirmation openings 532 serve as confirmation windows through which the inserted condition of the corrugated tubes 540A and 540B and the positions of the end portions 541 within the respective first and second upper covers 530A and 530B can be confirmed with the eyes without detaching these upper covers from the base 520.

The cover body portion 533 of each of the first and second upper covers 530A and 530B has an inverted U-shaped cross-section (generally semi-cylindrical shape) conforming to the shape of part (upper portion) of the outer peripheral surface of the corrugated tube 540A, 540B so that the cover body portion 533 can be fitted on the upper surface of the corrugated tube 540A, 540B from the upper side. In this embodiment, the cover body portion 533 is formed into a curvature corresponding to the outer diameter of the corrugated tube of the maximum diameter so that the cover body portion 533 can be fitted on any of the corrugated tubes of different diameters from the upper side to cover the same.

When the first upper cover 530A and the second upper cover 530B are to be attached to the base 520, the guide recess portions 534 receive the respective guide bars 525 formed on the base 520, and are moved vertically downward along the respective guide bars 525. Therefore, the four guide recess portions 534 are formed respectively at those portions of the first and second upper covers 530A and 530B corresponding respectively to the guide bars 525. Thanks to the engagement of the guide bars 525 in the respective guide recess portions 533, the insertion of the interconnecting piece portions 531 into the interconnecting piece retaining holes 523A of the respective retaining portions 523 is smoothly guided, and therefore this engaging operation assists in smoothly connecting the first and second upper covers 530A and 530B to the base 520, and besides after the first and second upper covers 530A and 530B are connected to the base 520, this connected condition is reinforced by the above engagement.

The base portion 535 of each of the first and second upper covers 530A and 530B has a flat surface disposed one step lower than the cover body portion 533 and extending therefrom. The base portions 535 of the first and second upper covers 530A and 530B are opposed to each other in such a manner that a predetermined space which is to be disposed just above the branch wire lead-out portions 526 is formed between the base portions 535. The flexible interconnecting portion 530C extends between the two base portions 536, and therefore the two base portions 535 are integrally interconnected by the flexible interconnecting portion 530C.

The cover-side retaining portions 536 are used for completely (secondarily) retaining the corrugated tubes (primarily or provisionally retained by the base-side retaining portions 522 of the base 520) when the first and second upper covers 530A and 530B are closed to be fitted on the corrugated tube end portions 541. The cover-side retaining portion 536 of each of the first and second upper covers 530A and 530B is elastically engaged in the groove on the bellows-shaped outer surface of the corrugated tube end portion 541 to hold the corrugated tube 540A, 540B, thereby preventing the axial movement of the corrugated tube 540A, 540B.

In this embodiment, each cover-side retaining portion 536 is a projection extending downwardly from the outer end of the cover body portion 533 as shown in FIG. 11 and FIGS. 16 to 18. In this embodiment, the cover-side retaining portion 536 projects downwardly from the generally cross-sectionally arc-shaped top wall portion of the cover body portion 533 at the end of the cover body portion 533.

A second elastic retaining piece portion (not shown) may be formed on each of the first and second upper covers 540A and 540B. In this case, at the time when the cover-side retaining portion 536 of each of the first and second upper covers 530A and 530B is fitted into the groove on the bellows-shaped outer surface of the end portion 541 of the corrugated tube 540A, 540B held on the holding portion 521, the second elastic retaining piece portion, like the cover-side retaining portion 536, is also elastically fitted into the groove on the bellows-shaped outer surface of the corrugated tube end portion 541.

Next, the operation for interconnecting the end portions 541 of the two corrugated tubes 540A and 540B by the use of the holder 510 of this embodiment will be described.

The interconnecting operation effected by the holder 510 includes a first operation for fixing the end portions 641 of the two corrugated tubes 540A and 540B by the base 520, and a second operation for mounting the first upper cover 530A and the second upper cover 530B on the base 520 in such a manner that the first and second upper covers 530A and 530B are fitted respectively on the end portions 541 of the corrugated tubes 540A and 540B from the upper side to fix these end portions 541. Although the base 520 is beforehand fixed to the mounting member (not shown) such as a panel by inserting the fixing portion 524 into the mounting hole in the mounting member, this fixing operation may be effected after the above second operation is finished.

(I) First Operation

Figure 19A:
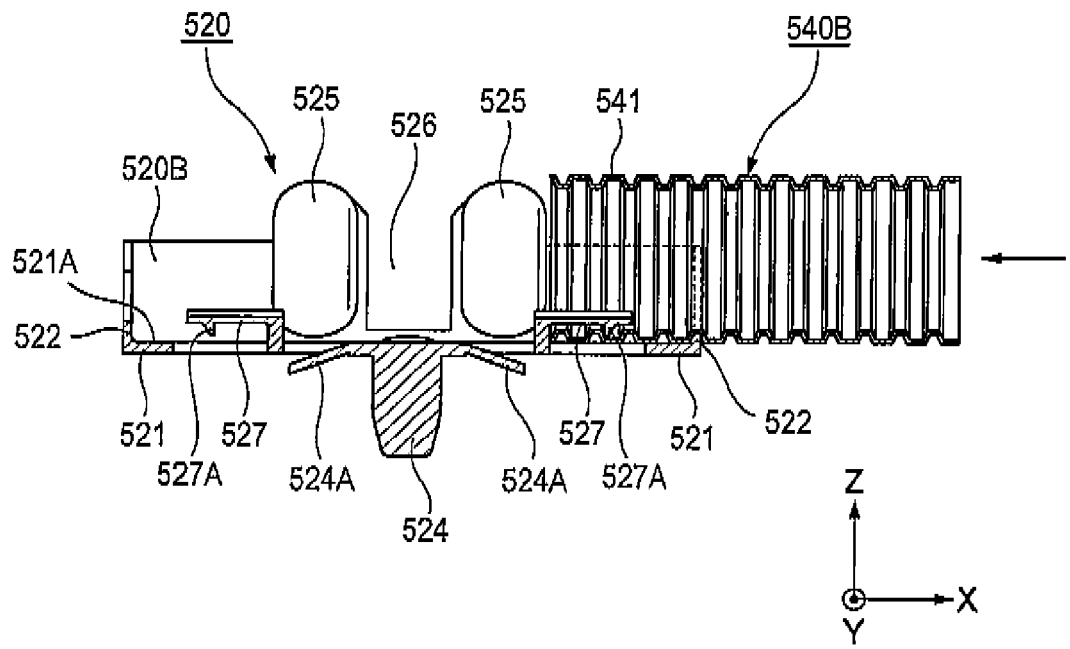
FIG. 19A is a view showing a condition in which the corrugated tube is primarily and provisionally retained on the base.
Figure 19B:
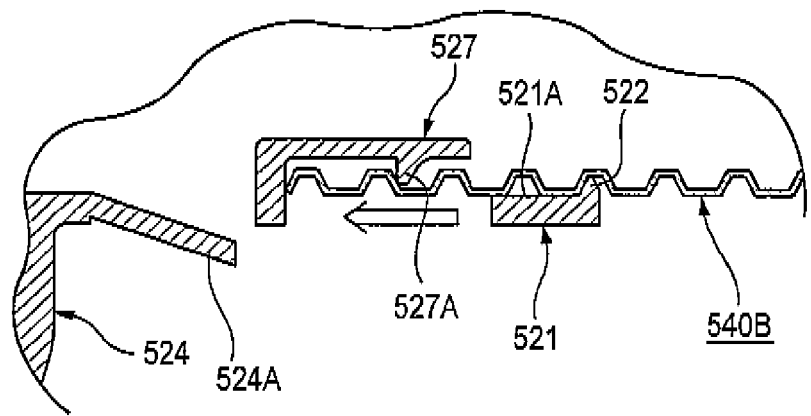
FIG. 19B is an enlarged view of an important portion.

First, the end portions 541 of the two corrugated tubes 540A and 540B are located near respectively to the pair of holding portions 521 of the base 520 as shown in FIG. 11, and are disposed in such a condition that the terminal edge portion of each end portion 541 is just about to be inserted into a gap between the elastic holding piece portion 527 and the floor portion 521A of the holding portion 521. Then, the end portion 541 of each corrugated tube 540A, 540B is pushed to be moved toward the inner end of the holding portion 521 in the axial direction of the corrugated tube 540A, 540B. As a result, this end portion 541 is moved toward the central portion of the base 520 while the ridges and grooves on the bellows-shaped inner surface of the end portion 541 are sequentially brought into engagement with the retaining claw 527A of the elastic holding piece portion 527 (see FIG. 19).

When the end portion 541 of each corrugated tube 540A, 540B is finally brought into abutting engagement with a proximal end portion of the elastic holding piece portion 527 extending vertically upwardly from the floor portion 521A, the axial movement of the end portion 541 is stopped. As a result, the corrugated tube 540A, 540B is disposed in the provisionally-retained condition in which the retaining claw 527A of the elastic holding piece portion 527 is engaged in the groove on the bellows-shaped inner surface of the end portion 541. At the same time, the base-side retaining portion 522 (projecting upwardly from the end portion of the holding portion 521) is fitted or engaged in the groove on the bellows-shaped outer surface of the end portion 541 of the corrugated tube 540A, 540B, so that the corrugated tube 540A, 540B is primarily retained on the base 520 (see FIG. 19).

Thus, each corrugated tube 540A, 540B is held relative to the base 520 without displacement by the base-side retaining portion 522 and the elastic holding piece portion 527. For the sake of convenience, here, although the operations for respectively holding the corrugated tubes 540A and 540B have been described at the same time, it is common to first hold one of the two corrugated tubes on the base 520 and then to hold the other corrugated tube on the base 520.

(II) Second Operation

Next, the operation for secondarily (that is, completely) retaining the corrugated tubes 540A and 540B in such a manner that the first and second upper covers 530A and 530B cover the respective corrugated tubes 540A and 540B from the upper side will be described.

In FIG. 11, each of the first upper cover 530A and the second upper cover 530A is located just above the base 520, and then is moved downward (in a direction (−Z)). At this time, each corrugated tubes 540A, 540B is already primarily retained relative to the base 520 without displacement, and therefore merely by positioning each upper cover 530A, 530B relative to the base 520 and connecting the upper cover to the base 520, the corrugated tube 540A, 540B can be secondarily retained on the base 520, that is, can be completely held on the holder 510.

Namely, for connecting each of the first upper cover 530A and the second upper cover 530B to the base 520, it is only necessary to locate the interconnecting piece portions 531 of each upper cover 530A, 530B just above the interconnecting piece retaining holes 523A of the respective retaining portions 523 of the base 520 and then to push the upper cover 530A, 530B to move the same toward the base 520 while moving the guide recess portions 534 of the upper cover 530A, 530B along the respective guide bars 525. By this pushing operation, each interconnecting piece portion 531 is moved downward within the interconnecting piece retaining hole 523A, and also each guide recess portion 534 is moved downward along the guide bar 525, and the cover body portions 533 of the first and second upper covers 530A and 530B are brought into abutting engagement respectively with the upper surfaces of the corrugated tubes 540A and 540B independently of each other, so that the end portion 541 of each corrugated tube 540A, 540B is completely (secondarily) retained by the cover-side retaining portion 536.

Figure 20:
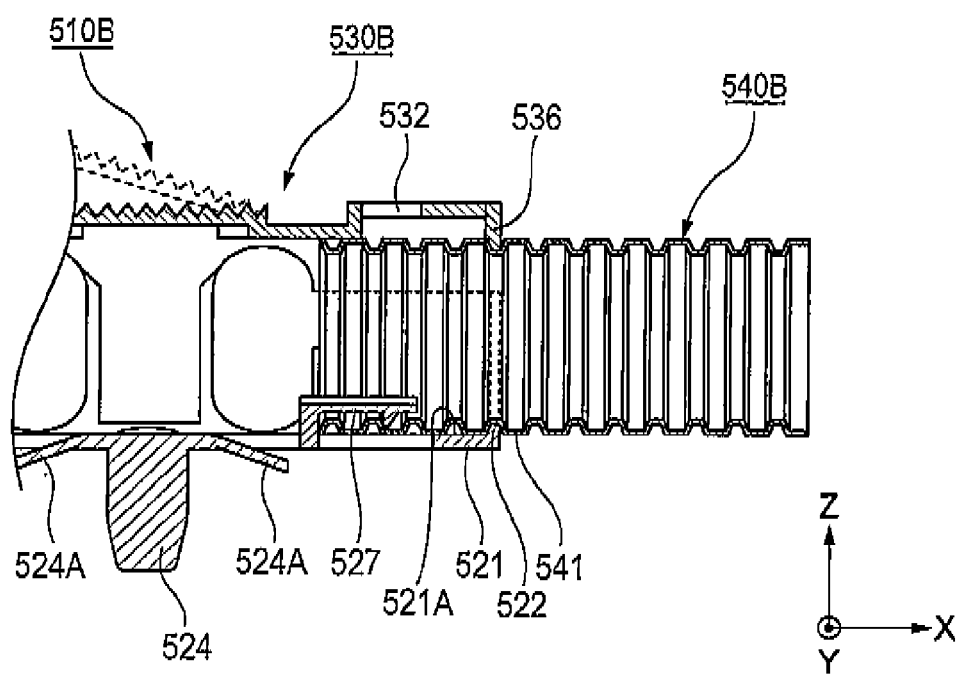
FIG. 20 is a view showing a condition in which the corrugated tube is secondarily (completely) retained by the second upper cover.

Namely, at the time when the retaining projection 531A of each interconnecting piece portion 531 of each upper cover 530A, 530B is retainingly engaged with the retaining claw 523B of the corresponding retaining portion 523, the cover-side retaining portion 536 of the upper cover 530A, 530B is fitted into the groove on the bellows-shaped outer surface of the end portion 541 of the corrugated tube 540A, 540B. As a result, the end portion 541 of the corrugated tube 540A, 540B is secondarily (that is, completely) retained by the upper cover 530A, 530B, so that the corrugated tube 540A, 540B is positively held by the holder 510 (see FIG. 20).

Figure 21A:
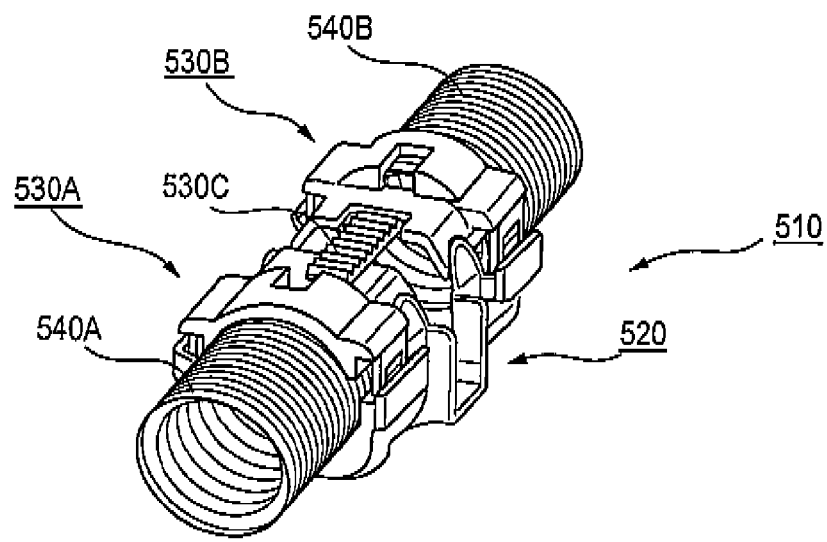
FIG. 21A is a perspective view showing a condition in which two larger-diameter corrugated tubes of the same diameter are connected together by the holder.
Figure 21B:
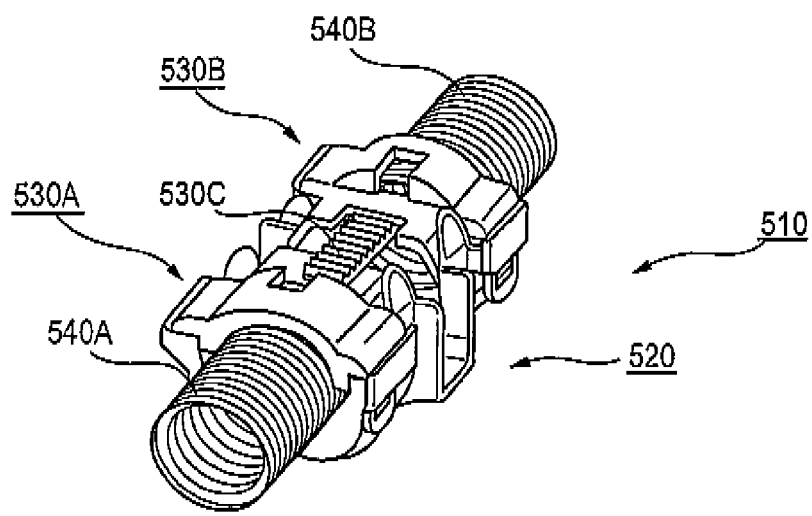
FIG. 21B is a perspective view showing a condition in which two smaller-diameter corrugated tubes of the same diameter are connected together by the holder.

In this manner, each corrugated tube 540A, 540B is positively held by the holder 510, and regardless of whether both of the corrugated tubes 540A and 540B have the larger-diameter as shown in FIG. 21A or have the smaller-diameter as shown in FIG. 21B, each corrugated tube 540A, 540B can be positively held by the holder 510.

Figure 23A:
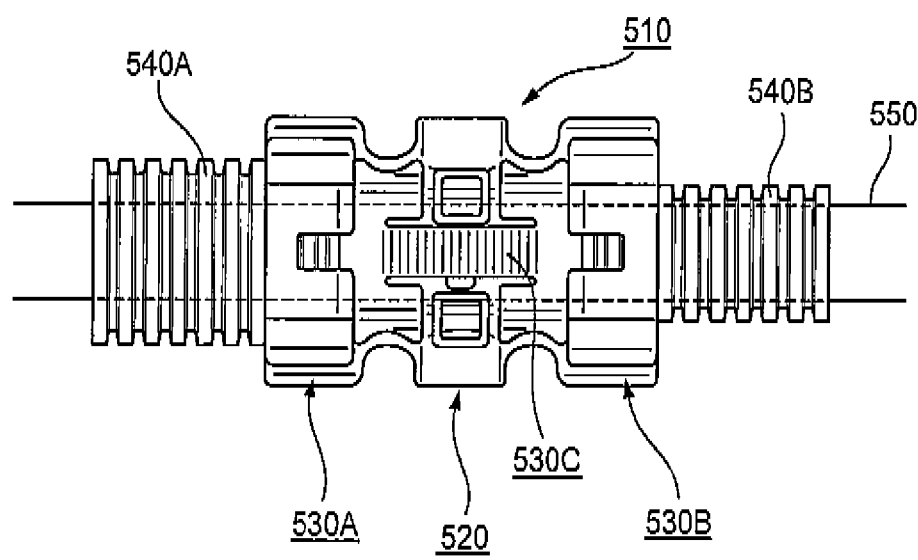
FIG. 23A is a plan view showing the holder and the corrugated tubes of FIG. 22.
Figure 23B:
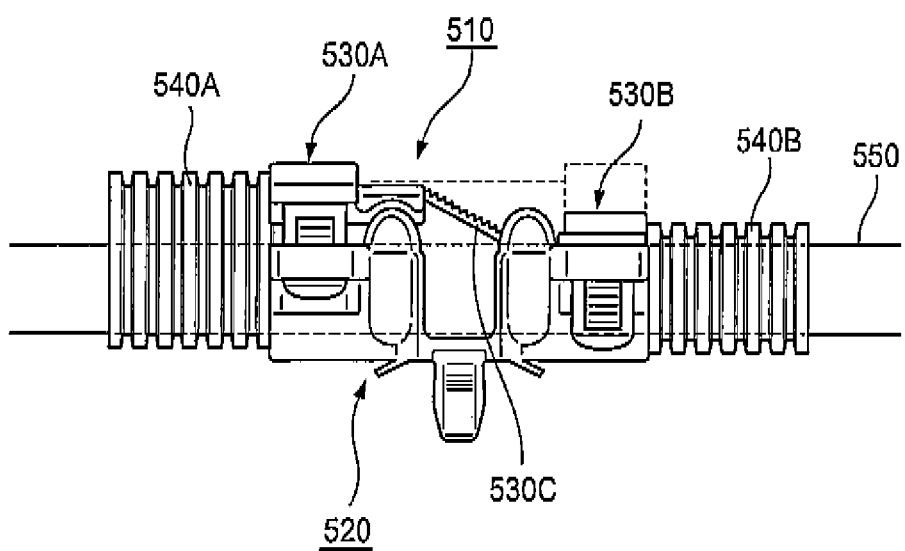
FIG. 23B is a front-elevational view showing the holder and the corrugated tubes of FIG. 22.

Furthermore, in this embodiment, even when one of the corrugated tubes 540A and 540B has the larger outer diameter while the other has the smaller outer diameter as shown in FIGS. 22 and 23, the flexible interconnecting portion 530C can be flexed into an inclined condition, and therefore the distance (connecting distance) between the first upper cover 530A and the base 520 and the distance (connecting distance) between the second upper cover 530B and the base 520 can be changed independently of each other. With this construction, the connecting distance of each of the first upper cover 530A and the second upper cover 530B relative to the base 520 can be adjusted so as to correspond to the outer diameter of either of the corrugated tubes 540A and 540B of different diameters.

In this embodiment, the two holding portions 521 are formed respectively at the axially-opposite (front and rear) end portions of the base 520, with the central portion of the base 520 lying therebetween. The end portions 541 of the two corrugated tubes 540A and 540B are held respectively on the holding portions 521 and therefore the holder 510 functions as a connector for interconnecting the two corrugated tubes 540A and 540B. In this case, the amount of pressing of the first upper cover 530A toward the base 520 (in other words, the distance between the cover body portion 533 and the floor portion 521A) and the amount of the pressing of the second upper cover 530B toward the base 520 can be adjusted independently of each other according to the outer diameter of the corrugated tube 540A, 540B, and therefore not only the corrugated tubes of the same diameter but also the corrugated tubes of different diameters can be positively and easily held by the holder 510 in interconnected relation. Namely, the holder 510 can hold the two corrugated tubes regardless of whether the two corrugated tubes have the same diameter or have different diameters.

In the above embodiment, although the holder includes the two holding portions and the two cover portions, the holder can have three or more holding portions and three or more upper covers so that a corresponding number of corrugated tubes can be connected together by the holder.

By the above configurations in the first and second embodiments, even when any of corrugated tubes of different diameters is used, a lower portion of an end portion of the corrugated tube is supported at two (right and left) points by the base-side retaining portion (the first and second base-side continuous retaining portions), and therefore any of the corrugated tubes of different diameters can be positively retained by the base-side retaining portion. Therefore, even when an external force such as a pulling force and a torsional force acts on any of the corrugated tubes of different diameters, the corrugated tube is prevented from being withdrawn from the holder.

Also, even when any of the corrugated tubes of different diameters is used, the lower portion of the end portion of the corrugated tube is supported at the two (right and left) points by the base-side retaining portion, and also the upper portion of the corrugated tube end portion is supported at one point (that is, at its uppermost portion) by the cover-side retaining portion, and thus the corrugated tube end portion is supported at the three points. Therefore, any of the corrugated tubes of different diameters can be positively retained.

Also, the lower portion of the corrugated tube end portion is supported at the two (right and left) points by the base-side retaining portion, and also the upper portion of the corrugated tube end portion is supported at two (right and left) points by the cover-side retaining portion (the first and second cover-side continuous retaining portions), and thus the corrugated tube end portion is supported at the four points. Therefore, any of the corrugated tubes of different diameters can be more positively retained.

Therefore, by the holder of the present invention, the lower portion of the end portion of any of the corrugated tubes of different diameters is supported at the two (right and left) points by the base-side retaining portion, and therefore any of the corrugated tubes of different diameters can be positively retained by the base-side retaining portion. Therefore, even when an external force such as a pulling force and a torsional force acts on any of the corrugated tubes of different diameters, the corrugated tube is prevented from being withdrawn from the holder.

Also, by the above configuration in the third embodiment, the first upper cover and the second upper cover interconnected by the flexible interconnecting portion are attached or connected to the base to cover the end portions of the corrugated tubes (having the grooves) from the upper side. Therefore, the first and second upper covers can be attached to the base in such a manner as to correspond respectively to the outer diameters of the corrugated tubes provisionally retained on the base. Therefore, the holder can hold the end portions of the two corrugated tubes of different outer diameters, and the versatility of the holder is enhanced.

Also, the flexible interconnecting portion interconnecting the first and second upper covers can be easily flexed to be inclined. And besides, the flexible interconnecting portion serves also as a protector for protecting flexible wire members passing through the corrugated tubes.

Therefore, by the holder of the present invention, the first upper cover and the second upper cover interconnected by the flexible interconnecting portion are attached or connected to the base to cover the end portions of the corrugated tubes from the upper side. Therefore, the first and second upper covers can be attached to the base in such a manner as to correspond respectively to the outer diameters of the corrugated tubes provisionally retained on the base, so that each corrugated tube can be fixed between the base and the corresponding upper cover. Therefore, the holder can positively hold the end portions of the two corrugated tubes of different outer diameters, and the versatility of the holder is enhanced.

The present application is based on Japanese Patent Application No. 2008-330265 filed on Dec. 25, 2008 and Japanese Patent Application No. 2008-330260 filed on Dec. 25, 2008, the contents of which are incorporated herein for reference.

What is claimed is:

1. A holder comprising:
    a first cover that covers a first part of a corrugated tube in a radial direction of the corrugated tube; and
    a second cover engaged with the first cover and that covers a second part of the corrugated tube in the radial direction,
    wherein a first retaining portion is formed on the first cover and is engaged in a groove on a bellows-shaped outer face of the corrugated tube;
    wherein a second retaining portion is formed on the second cover and is engaged in the groove on the bellows-shaped outer face of the corrugated tube;

wherein the first cover includes a base portion having a substantially flat portion and a pair of side wall portions extending vertically respectively from both a first end and a second end of the base portion;

wherein the first retaining portion includes a first retaining piece which protrudes and continuously extends from a surface of one of the side wall portions to the substantially flat portion of the base portion and a second retaining piece which protrudes and continuously extends from a surface of the other of the side wall portions to the substantially flat portion of the base portion; and wherein the first retaining piece and the second retaining piece are separated from each other to form an air gap at the base portion.

2. The holder according to claim 1, wherein the first retaining portion covers a radially-lower portion of a corrugated tube, and the second retaining portion covers a radially-upper portion of the corrugated tube.

3. The holder according to claim 1, wherein the second cover includes a base portion and a pair of side wall portions extending vertically respectively from both ends of the base portion; and wherein the second retaining portion continuously extends between the side wall portions of the second cover and is integrally formed on the base portion of the second cover.

4. The holder according to claim 1, wherein the first cover further comprises:
two wire lead-out portions formed respectively at transversely-opposite side portions of the base portion.

5. The holder according to claim 4, wherein the first cover further comprises:
two pairs of guide bars configured to engage the second cover.

6. The holder according to claim 5, wherein each of the two pairs of guide bars has a transverse cross-section which is a generally semi-cylindrical shape.

7. The holder according to claim 1, wherein the second cover includes a base portion and a pair of side wall portions extended vertically respectively from both ends of the base portion;

wherein the second retaining portion includes a first retaining piece which continuously extends from one of the side wall portions of the second cover to the base portion of the second cover and a second retaining piece which continuously extends from the other of the side wall portions of the second cover to the base portion of the second cover; and wherein the first retaining piece and the second retaining piece of the second retaining portion are separated from each other with air gap at the base portion of the second cover.

* * * * *